United States Patent
He et al.

(10) Patent No.: US 9,059,481 B2
(45) Date of Patent: Jun. 16, 2015

(54) NON-FLAMMABLE QUASI-SOLID ELECTROLYTE AND NON-LITHIUM ALKALI METAL OR ALKALI-ION SECONDARY BATTERIES CONTAINING SAME

(71) Applicants: Hui He, Beavercreek, OH (US); Bor Z Jang, Centerville, OH (US); Yanbo Wang, Huber Heights, OH (US); Aruna Zhamu, Centerville, OH (US)

(72) Inventors: Hui He, Beavercreek, OH (US); Bor Z Jang, Centerville, OH (US); Yanbo Wang, Huber Heights, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 182 days.

(21) Appl. No.: 13/987,764

(22) Filed: Aug. 30, 2013

(65) Prior Publication Data

US 2015/0064574 A1    Mar. 5, 2015

(51) Int. Cl.
*H01M 6/18* (2006.01)
*H01M 10/0568* (2010.01)
*H01M 10/05* (2010.01)
*H01M 4/40* (2006.01)

(52) U.S. Cl.
CPC ........ *H01M 10/0568* (2013.01); *H01M 10/05* (2013.01); *H01M 4/405* (2013.01)

(58) Field of Classification Search
CPC .............. H01M 4/405; H01M 10/056; H01M 10/0569; Y02E 60/12
USPC .......... 429/188, 304, 321, 322, 324, 337, 338
See application file for complete search history.

(56) References Cited

U.S. PATENT DOCUMENTS

| | | | |
|---|---|---|---|
| 6,245,465 B1 * | 6/2001 | Angell et al. | 429/340 |
| 7,575,830 B2 * | 8/2009 | Kawamura et al. | 429/218.1 |
| 7,759,008 B2 | 7/2010 | Barker et al. | |
| 8,734,996 B2 * | 5/2014 | Feng et al. | 429/231.8 |
| 2006/0121355 A1 * | 6/2006 | Kolosnitsyn et al. | 429/326 |
| 2006/0234123 A1 * | 10/2006 | Vallee et al. | 429/231.1 |
| 2011/0236766 A1 * | 9/2011 | Kolosnitsyn et al. | 429/337 |
| 2012/0082890 A1 * | 4/2012 | Dong et al. | 429/188 |
| 2012/0235644 A1 * | 9/2012 | Gordon et al. | 320/127 |
| 2014/0272607 A1 * | 9/2014 | Amine et al. | 429/338 |
| 2014/0342249 A1 * | 11/2014 | He et al. | 429/403 |

OTHER PUBLICATIONS

Zhuo, X.Y. Wang, A.P. Tang, Z.M. Liu, S. Gamboa, P.J. Sebastian, Journal of Power Sources 160 (2006) 698.
J. F. Whitacre, "Na4Mn9O18 as a positive electrode material for an aqueous electrolyte sodium-ion energy storage device," Electrochemistry Commun. 12 (2010) 463-466.
U.S. Appl. No. 10/858,814 , "Process for producing nano-scaled graphene plates", B.Jang, filed Jun. 3, 2004, now abandoned.

* cited by examiner

*Primary Examiner* — Nina Bhat

(57) ABSTRACT

A non-flammable quasi-solid electrolyte and a rechargeable non-lithium alkali metal cell containing this electrolyte. The electrolyte comprises an alkali metal salt dissolved in an organic liquid solvent with a concentration higher than 2.5 M (preferably >3.5 M) or a molecular ratio greater than 0.2 (preferably >0.3), wherein the alkali metal is selected from Na, K, a combination of Na and K, or a combination of Na and/or K with Li. The alkali metal salt concentration is sufficiently high so that the electrolyte exhibits a vapor pressure <0.01 kPa when measured at 20° C., a vapor pressure <60% of the vapor pressure of thet organic solvent when measured alone, a flash point at least 20 degrees Celsius higher than a flash point of the organic liquid solvent when measured alone, a flash point higher than 150° C., or no detectable flash point.

29 Claims, 13 Drawing Sheets

(A)

(B)

(C)

NON-FLAMMABLE QUASI-SOLID ELECTROLYTE AND NON-LITHIUM ALKALI METAL OR ALKALI-ION SECONDARY BATTERIES CONTAINING SAME

FIELD OF THE INVENTION

The present invention provides a non-flammable electrolyte composition and a secondary or rechargeable non-lithium alkali battery containing such an electrolyte composition. The alkali metal is selected from sodium, potassium, or a mixture of sodium and/or potassium with lithium (but not lithium alone).

BACKGROUND

The availability of safe, low-cost, long cycle-life, and efficient energy storage devices is essential to increased use of renewable energy and environmentally friendly electric vehicles (EVs). Rechargeable lithium-ion (Li-ion), lithium metal, lithium-sulfur, and Li metal-air batteries are considered promising power sources for electric vehicle (EV), hybrid electric vehicle (REV), and portable electronic devices, such as lap-top computers and mobile phones. Lithium as a metal element has the highest lithium storage capacity (3,861 mAh/g) compared to any other metal. Hence, in general, Li metal batteries (having a lithium metal anode) have a significantly higher energy density than lithium-ion batteries (having a graphite anode with a theoretical specific capacity of 372 mAh/g).

Historically, rechargeable lithium metal batteries were produced using non-lithiated compounds, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte, and the cathode became lithiated. Unfortunately, upon repeated charges and discharges, the lithium metal resulted in the formation of dendrites at the anode that ultimately penetrated through the separator to reach the cathode, causing internal shorting, thermal runaway, and explosion. As a result of a series of accidents associated with this problem, the production of these types of secondary batteries was stopped in the early 1990's giving ways to lithium-ion batteries.

Even now, cycling stability and safety concerns remain the primary factors preventing the further commercialization of Li metal batteries (e.g. Lithium-sulfur and Lithium-transition metal oxide cells) for EV, HEV, and microelectronic device applications. Again, cycling stability and safety issues of lithium metal rechargeable batteries are primarily related to the high tendency for Li metal to form dendrite structures during cycling or overcharges, leading to internal electrical shorting and thermal runaway. This thermal runaway or even explosion is caused by the organic liquid solvents used in the electrolyte (e.g. carbonate and ether families of solvents), which are unfortunately highly volatile and flammable.

Parallel to these efforts and prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1, implying a relatively low anode specific capacity (theoretically 372 mAh/g of graphite, but practically 300-360 mAh/g). Since the cathode specific capacity is typically in the range of 130-200 mAh/g, the energy density of the resulting lithium-ion cell is typically in the range of 150-200 Wh/g.

Although lithium-ion (Li-ion) batteries are promising energy storage devices for electric drive vehicles, state-of-the-art Li-ion batteries have yet to meet the cost, safety, and performance targets. In particular, the same flammable solvents previously used for lithium metal secondary batteries are also used in most of the lithium-ion batteries. Despite the notion that there is significantly reduced propensity of forming dendrites in a lithium-ion cell (relative to a lithium metal cell), the lithium-ion cell has its own intrinsic safety issue. For instance, the transition metal elements in the lithium metal oxide cathode are highly active catalysts that can promote and accelerate the decomposition of organic solvents, causing thermal runaway or explosion initiation to occur at a relatively low electrolyte temperature (e.g. <200° C., as opposed to normally 400° C. without the catalytic effect).

As a totally distinct class of energy storage device, sodium batteries have been considered as an attractive alternative to lithium batteries since sodium is abundant and the production of sodium is significantly more environmentally benign compared to the production of lithium. In addition, the high cost of lithium is a major issue.

Sodium ion batteries using a hard carbon-based anode (Na-carbon intercalation compound) and a sodium transition metal phosphate as a cathode have been described by several research groups: Zhuo, X. Y. Wang, A. P. Tang, Z. M. Liu, S. Gamboa, P. J. Sebastian, Journal of Power Sources 160 (2006) 698; J. Barker, Y. Saidi, J. Swoyer, US Patent Application US2005/0238961, 2005; J. Barker; M. Y. Saidi, and J. Swoyer, "Sodium Ion Batteries," U.S. Pat. No. 7,759,008 (Jul. 20, 2010 and J. F. Whitacre, A. Tevar, and S. Sharma, "$Na_4Mn_9O_{18}$ as a positive electrode material for an aqueous electrolyte sodium-ion energy storage device," Electrochemistry Communications 12 (2010) 463-466.

However, these sodium-based devices exhibit even lower specific energies and rate capabilities than Li-ion batteries. These conventional sodium-ion batteries require lithium ions to diffuse in and out of a sodium intercalation compound at both the anode and the cathode. The required solid-state diffusion processes for sodium ions in a sodium-ion battery are even slower than the Li diffusion processes in a Li-ion battery, leading to excessively low power densities. Instead of hard carbon or other carbonaceous intercalation compound, sodium metal may be used as the anode active material in a sodium metal cell. However, the use of metallic sodium as the anode active material is normally considered undesirable and dangerous because of dendrite formation, interface aging, and electrolyte incompatibility problems. Most significantly, the same flammable solvents previously used for lithium secondary batteries are also used in most of the sodium metal or sodium-ion batteries.

Hence, a general object of the present invention is to provide an electrolyte system for a rechargeable Na metal cell, K metal cell, hybrid Na/K metal cell, Na-ion cell, K-ion cell, or hybrid Na/K cell that exhibits a high energy density, high power density, long cycle life, and no danger of explosion due to the use of a safe, non-flammable, quasi-solid electrolyte. The invention also provides a rechargeable non-lithium alkali metal or alkali-ion cell containing such a safe electrolyte system. This cell includes the Na or K metal secondary cell, Na-ion cell, K-ion cell, or a non-lithium alkali metal hybrid cell, wherein at least one electrode operates on Na or K insertion or intercalation.

A specific object of the present invention is to provide a rechargeable non-lithium alkali metal battery that exhibits an exceptionally high specific energy or high energy density and a high level of safety. One specific technical goal of the present invention is to provide a safe Na- or K-metal based battery having a long cycle life and a cell specific energy greater than 200 Wh/Kg, preferably greater than 300 Wh/Kg, and more preferably greater than 400 Wh/Kg (all based on the total cell weight).

A specific object of the present invention is to provide a rechargeable non-lithium alkali metal cell based on rational materials and battery designs that overcome or significantly reduce the following issues commonly associated with conventional alkali metal cells: (a) dendrite formation (internal shorting due to sharp dendrite penetrating the separator to reach the cathode); (b) extremely low electric and ionic conductivities of Na intercalation compound in the cathode, requiring large proportion (typically 10-30%) of non-active conductive fillers and having significant proportion of non-accessible or non-reachable cathode active material); and (c) short cycle life.

Another object of the present invention is to provide a simple, cost-effective, and easy-to-implement approach to preventing potential Na metal dendrite-induced internal short circuit and thermal runaway problems in various Na metal and Na-ion batteries.

SUMMARY OF THE INVENTION

This invention provides a non-flammable quasi-solid electrolyte for use in a rechargeable alkali metal cell. The electrolyte comprises an alkali metal salt dissolved in a first organic liquid solvent with a concentration higher than 2.5 M or with the alkali metal salt having a molecular ratio greater than 0.2, wherein the alkali metal is selected from sodium (Na), potassium (K), a combination of Na and K, or a combination of Na and/or K with lithium (Li) and said alkali metal does not include lithium alone. The alkali metal salt concentration is sufficiently high so that the electrolyte exhibits a vapor pressure less than 0.01 kPa when measured at 20° C., a vapor pressure less than 60% of the vapor pressure of the first organic solvent when measured alone, a flash point at least 20 degrees Celsius higher than a flash point of the first organic liquid solvent when measured alone, a flash point higher than 150° C., or no detectable flash point. Preferably, in this non-flammable quasi-solid electrolyte, the concentration of alkali metal salt is greater than 3 M (preferably >4 M, more preferably >5 M, further preferably >6 M, and most preferably >7 M) or the alkali metal salt has a molecular ratio greater than 0.25 (preferably >0.3, more preferably >0.4, further preferably >0.5, and most preferably >0.6). The Na or K salt concentration can be as high as 10 M.

We have surprisingly discovered that the flammability of any organic solvent can be effectively suppressed provided that a sufficiently high amount of an alkali-metal salt is added to and dissolved in this organic solvent to form a solid-like or quasi-solid electrolyte. In general, such a quasi-solid electrolyte exhibits a vapor pressure less than 0.01 kPa (when measured at 20° C.) and less than 0.1 kPa (when measured at 100° C.). In many cases, the vapor molecules are practically too few to be detected. The high solubility of the alkali metal salt in an otherwise highly volatile solvent has effectively prevented the flammable gas molecules from initiating a flame even at an extremely high temperature. The flash point of the quasi-solid electrolyte is typically at least 20 degrees (often >50 degrees) higher than the flash point of the neat organic solvent alone. In most of the cases, either the flash point is higher than 150° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

Another surprising element of the present invention is the notion that we are able to dissolve a high concentration of an alkali metal salt in an organic solvent to form an electrolyte suitable for use in a rechargeable alkali metal battery. This concentration is typically greater than a non-lithium alkali metal salt molecular ratio >0.2, more typically >0.3, can be >0.4, 0.5, 0.6, and even >0.7. In a more easily understood but scientifically less accurate manner, the alkali metal salt concentration is typically greater than 3.5 M (mole/liter), more typically and preferably greater than 4 M, still more typically and preferably greater than 5 M, further more preferably greater than 7 M, and most preferably greater than 10 M. Such a high concentration of alkali metal salt in a solvent has not been generally considered possible. Indeed, in general, it has not been possible to achieve such a high concentration of alkali metal salt in an organic solvent used in a battery electrolyte. After an extensive and in-depth study, we came to further discover that the apparent solubility of an alkali metal salt in a solvent could be significantly increased if (a) a highly volatile co-solvent is used to increase the maximum amount of alkali metal salt dissolved in the solvent mixture first and then (b) this volatile co-solvent is partially or totally removed once the dissolution procedure is completed. Quite unexpectedly, the removal of this co-solvent typically did not lead to precipitation or crystallization of the alkali metal salt out of the solution even though the solution would have been in a highly supersaturated state. This novel and unique approach appears to have produced a material state wherein most of the solvent molecules are retained or captured by alkali metal salt ions that are not volatile. Hence, very few solvent molecules are able to escape into the vapor phase. Consequently, very few volatile gas molecules can be present to initiate or sustain a flame. This has not been suggested as technically possible or viable in any previous report.

It may be noted that a good scientist in the field of chemistry or the field of materials science would anticipate that such a high salt concentration would make the electrolyte behave like a solid with an extremely high viscosity and, hence, this electrolyte would not be amenable to fast diffusion of alkali metal ions ($Na^+$ or $K^+$) therein. Consequently, the scientist would tend to expect that an alkali metal battery containing such a solid-like electrolyte would not and could not exhibit a high capacity at a high charge-discharge rate or under a high current density condition (i.e. the battery should have a poor rate capability). Contrary to these expectations, all the alkali metal cells containing such a quasi-solid electrolyte deliver a surprisingly high energy density and high power density for a long cycle life. The quasi-solid electrolytes as herein disclosed are conducive to facile alkali metal ion transport. This surprising observation is manifested by a high $Na^+$ or $K^+$ ion transference number (TN), leading to a high ion conductivity. This TN approach is to be further explained in a later section of this specification. We have found that the quasi-solid electrolytes provide a TN greater than 0.4 (typically in the range of 0.4-0.8), in contrast to the typical values of 0.1-0.2 in all lower concentration electrolytes (e.g. <2.0 M) used in all current Li-ion, Na-ion cells, and Li—S cells.

The non-flammable quasi-solid electrolyte has a sodium or potassium ion transference number typically greater than 0.3, and more typically greater than 0.4, more preferably and typically greater than 0.5, further more preferably and typically greater than 0.6, and most preferably and typically greater than 0.7. It may be noted that the $Na^+$ or $K^+$ ion transference number of an electrolyte (given the same type and concentration of alkali metal salt in the same solvent) can vary from a battery type to another; e.g. from an alkali metal cell (where the anode is Na or K metal) to a Na-ion or K-ion cell (where the anode is hard carbon as an example). The total amount of Na or K available for moving back and forth between the anode and the cathode is an important factor that dictates this transference number.

In the embodiment stated above, the first organic liquid solvent may be selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether (e.g. methyl perfluorobutyl ether, MFE, or ethyl perfluorobutyl ether, EFE), and combinations thereof.

The non-flammable quasi-solid electrolyte contains a non-lithium alkali metal salt preferably selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), bis-trifluoromethyl sulfonylimide potassium ($KN(CF_3SO_2)_2$), or a combination thereof.

The electrolyte may further contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof. The electrolyte does not contain a lithium salt alone, without the presence of other alkali metal salt.

The non-flammable quasi-solid electrolyte may further contain an ionic liquid solvent and a first organic liquid solvent-to-ionic liquid solvent ratio is greater than 1/1. The ionic liquid solvent is selected from a room temperature ionic liquid having a cation selected from tetraalkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof. The ionic liquid solvent is selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

The second embodiment of the present invention is a rechargeable non-lithium alkali metal cell selected from a Na metal secondary cell, a Na-ion cell, a K metal cell, a K-ion cell, or a hybrid cell. The rechargeable Na or K cell comprises a cathode having a cathode active material, an anode having an anode active material, a porous separator separating the anode and the cathode, a non-flammable quasi-solid electrolyte in contact with the cathode and the anode, wherein the electrolyte contains an alkali metal salt dissolved in a first organic liquid solvent with a concentration sufficiently high so that the electrolyte exhibits a vapor pressure less than 0.01 kPa when measured at 20° C., a flash point at least 20 degrees Celsius higher than a flash point of said first organic liquid solvent alone, a flash point higher than 150° C., or no flash point, wherein the alkali metal salt concentration has a molecular ratio is greater than 0.2 (preferably >0.3, more preferably >0.4, and most preferably >0.5).

In the rechargeable alkali metal cell, the cathode active material may contain a sodium intercalation compound selected from $NaFePO_4$ (Sodium iron phosphate), $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$ (Sodium cobalt oxide), $Na_{2/3}[Ni_{1/3}Mn_{2/3}]O_2$, $Na_x(Fe_{1/2}Mn_{1/2})O_2$, $Na_xMnO_2$ (Sodium manganese bronze), $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$ (Copper and nickel Hexacyanoferrate), NiHCF (Nickel Hexacyanoferrate), $NaxMnO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

Alternatively, the cathode active material may be selected from a functional material or nano-structured material having an alkali metal ion-capturing functional group or alkali metal ion-storing surface in direct contact with the electrolyte. Preferably, the functional group reversibly reacts with an alkali metal ion, forms a redox pair with an alkali metal ion, or forms a chemical complex with an alkali metal ion. The functional material or nano-structured material may be selected from the group consisting of: (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nano-fiber, nano-wire, metal oxide nano-wire or fiber, conductive polymer nano-fiber, or a combination thereof; (e) a carbonyl-containing organic or polymeric molecule; (f) a functional material containing a carbonyl, carboxylic, or amine group; and combinations thereof.

The functional material or nano-structured material may be selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$(Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. Desirably, the functional material or nano-structured material has a functional group selected from —COOH, =O, —NH$_2$, —OR, or —COOR, where R is a hydrocarbon radical.

In a preferred embodiment, the functional material or nano-structured has a specific surface area of at least 500 m$^2$/g, preferably at least 1,000 m$^2$/g.

In the rechargeable alkali metal, the anode may contain an alkali ion source selected from an alkali metal, an alkali metal alloy, a mixture of alkali metal or alkali metal alloy with an alkali intercalation compound, an alkali element-containing compound, or a combination thereof. Particularly desired is an anode active material that contains an alkali intercalation compound selected from petroleum coke, carbon black, amorphous carbon, hard carbon, templated carbon, hollow carbon nanowires, hollow carbon sphere, titanates, NaTi$_2$(PO$_4$)$_3$, Na$_2$Ti$_3$O$_7$ (Sodium titanate), Na$_2$C$_8$H$_4$O$_4$ (Disodium Terephthalate), Na$_2$TP (Sodium Terephthalate), TiO$_2$, carboxylate based materials, C$_8$H$_4$Na$_2$O$_4$, C$_8$H$_6$O$_4$, C$_8$H$_5$NaO$_4$, C$_8$Na$_2$F$_4$O$_4$, C$_{10}$H$_2$Na$_4$O$_8$, C$_{14}$H$_4$O$_6$, C$_{14}$H$_4$Na$_4$O$_8$, or a combination thereof.

In general, the alkali intercalation compound or alkali-containing compound may be selected from the following groups of materials: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and (d) Sodium or potassium salts.

The rechargeable alkali metal cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures. The alkali metal cell may further comprise an anode current collector selected from copper foil or web, carbon- or graphene-coated copper foil or web, stainless steel foil or web, carbon- or graphene-coated steel foil or web, titanium foil or web, carbon- or graphene-coated titanium foil or web carbon or graphite paper, carbon or graphite fiber fabric, flexible graphite foil, graphene paper or film, or a combination thereof.

DETAILED DESCRIPTION OF PREFERRED EMBODIMENTS

Figure 1:
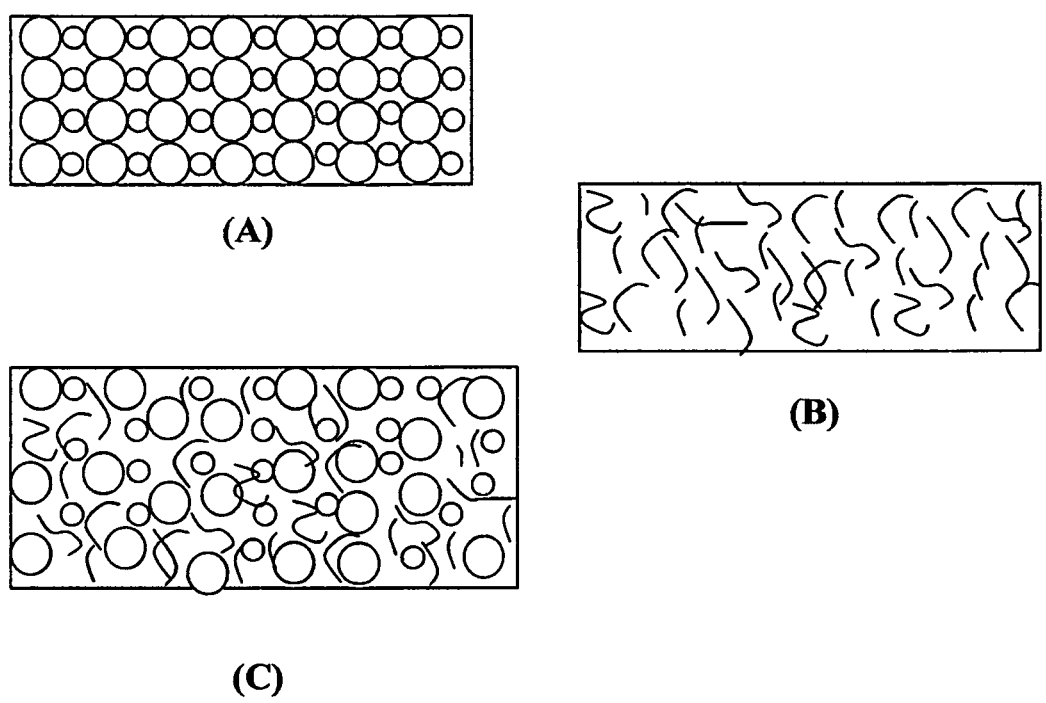
FIG. 1(a) Schematic of the closely packed, highly ordered structure of a solid electrolyte; (b) schematic of a totally amorphous liquid electrolyte having large fractions of free volume through which cations (e.g. Na+) can easily migrate; (c) schematic of the randomized or amorphous structure of a quasi-solid electrolyte having solvent molecules separating salt species to produce amorphous zones for easy migration of free (un-clustered) cations.
Figure 2:
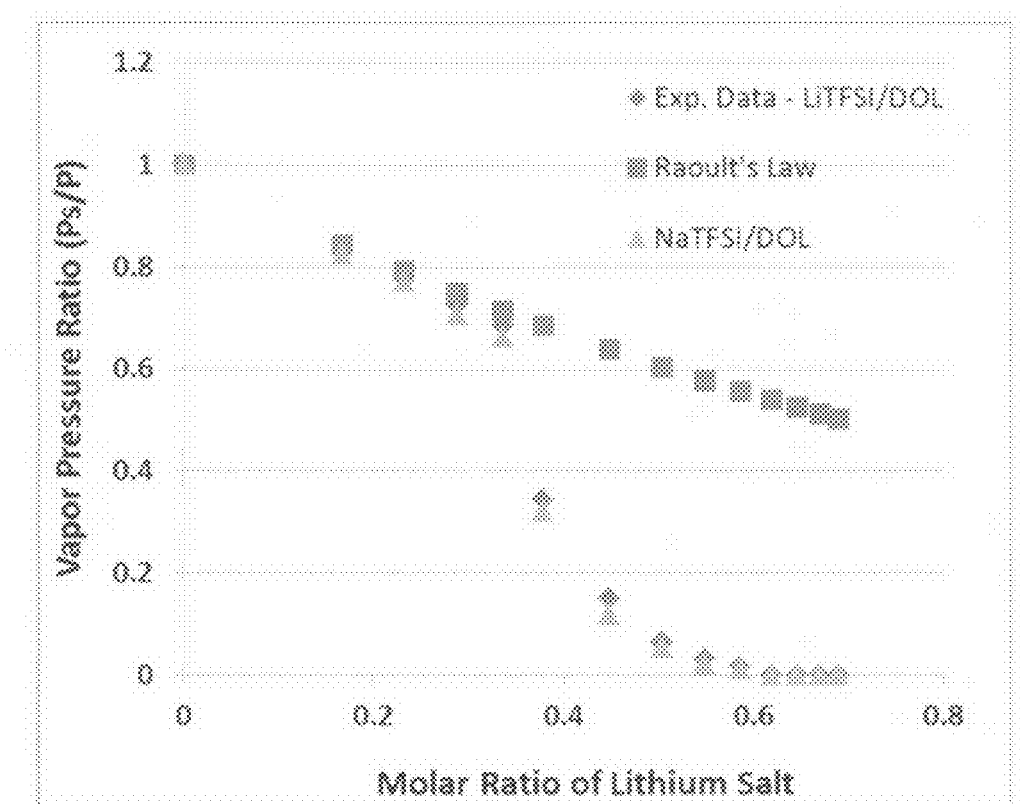
FIG. 2 Vapor pressure ratio data ($p_s$/p=vapor pressure of solution/vapor pressure of solvent alone) as a function of the sodium salt molecular ratio x (NaTFSI/DOL), along with the theoretical predictions based on the classic Raoult's Law.
Figure 3:
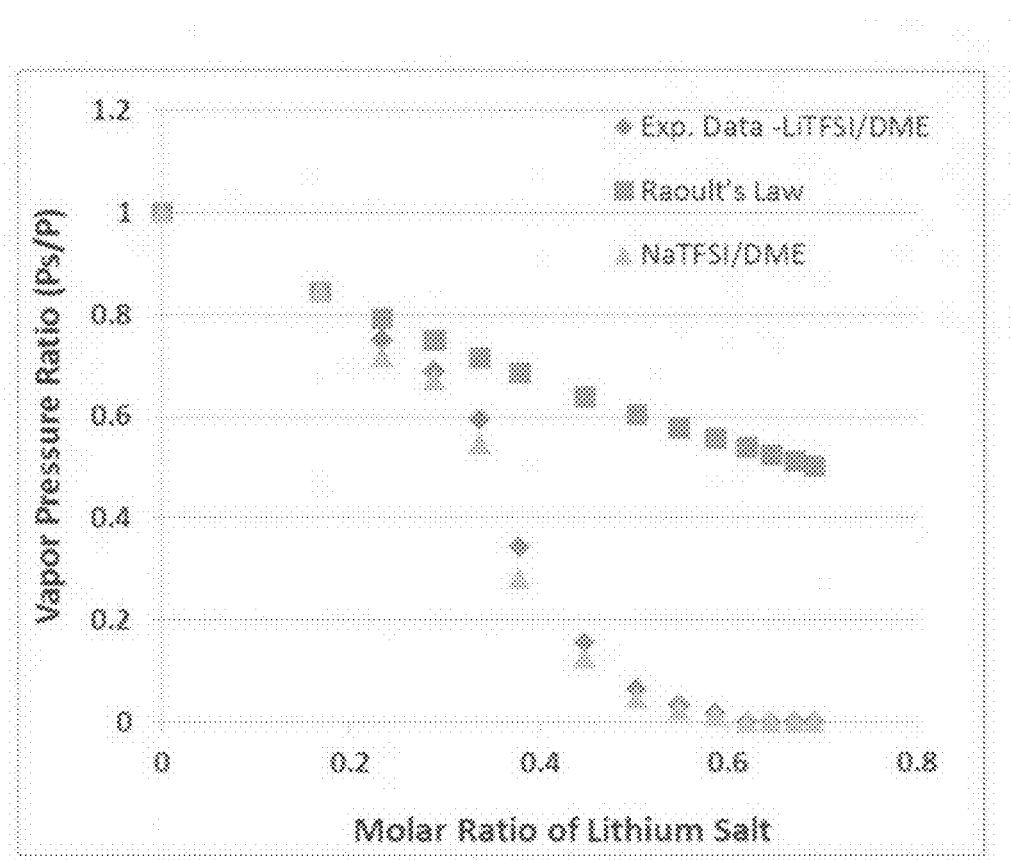
FIG. 3 Vapor pressure ratio data ($p_s$/p=vapor pressure of solution/vapor pressure of solvent alone) as a function of the sodium salt molecular ratio x (NaTFSIMME), along with the theoretical predictions based on classic Raoult's Law.
Figure 4:
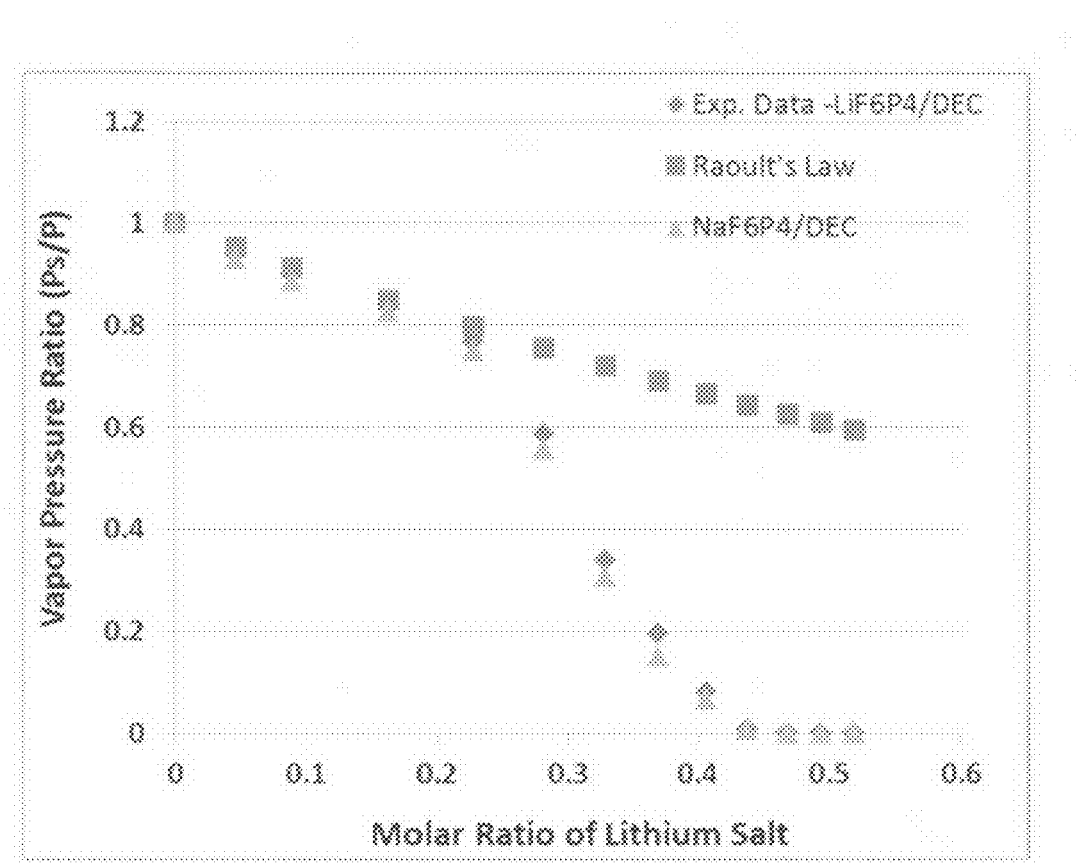
FIG. 4 Vapor pressure ratio data ($p_s$/p=vapor pressure of solution/vapor pressure of solvent alone) as a function of the sodium salt molecular ratio x (NaPF$_6$/DOL), along with the theoretical predictions based on classic Raoult's Law.
Figure 5:
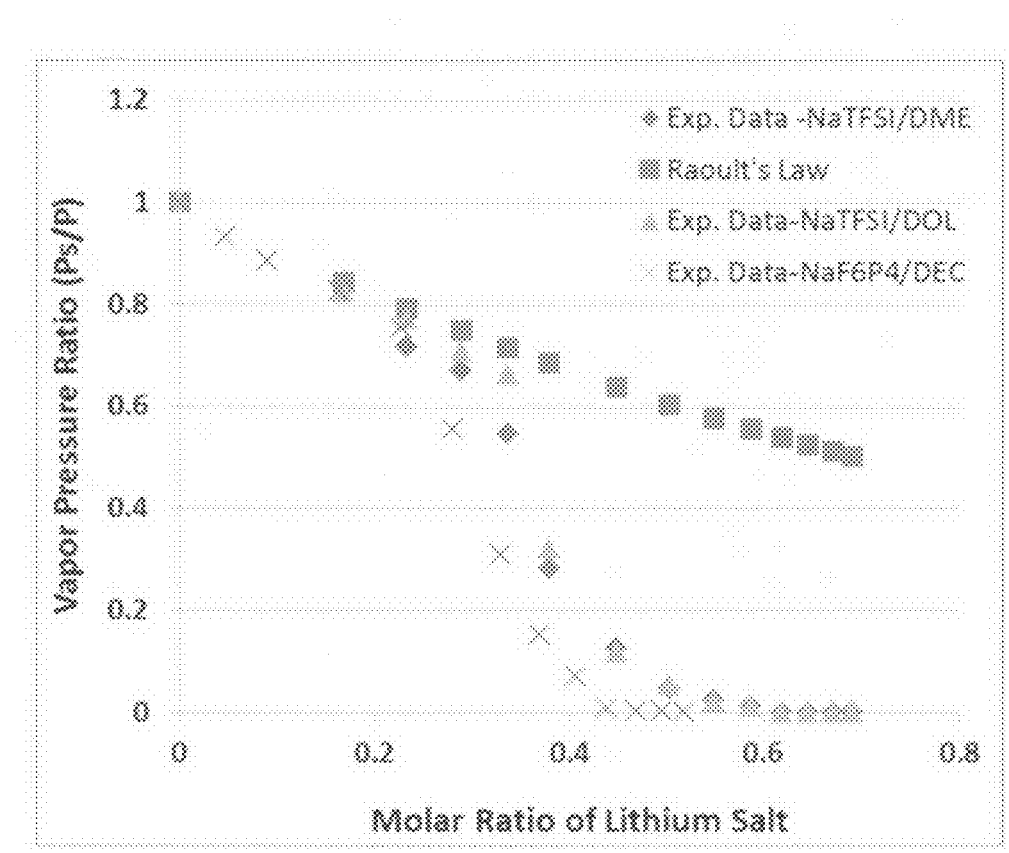
FIG. 5 Vapor pressure ratio data ($p_s$/p=vapor pressure of solution/vapor pressure of solvent alone) as a function of the sodium salt molecular ratio x (NaTFSI/DOL, NaTFSI/DME, NaPF$_6$/DOL), along with the theoretical predictions based on classic Raoult's Law.
Figure 6:
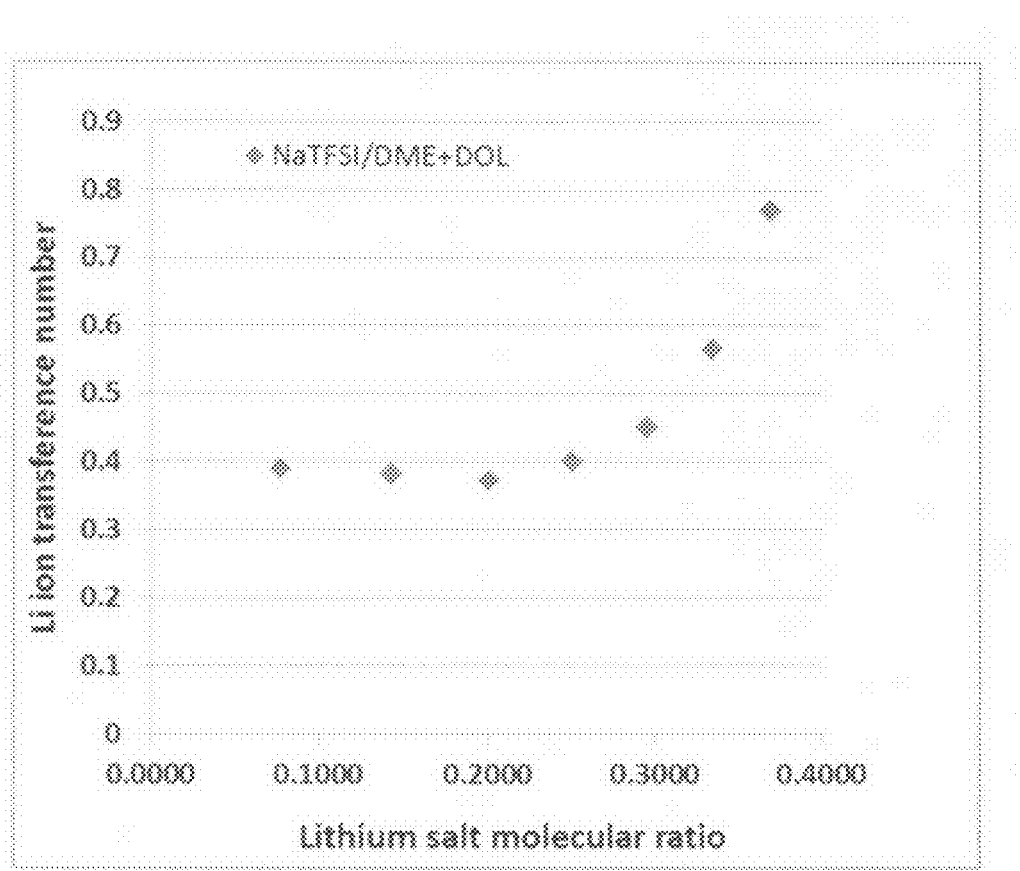
FIG. 6 The Na$^+$ ion transference numbers of electrolytes (e.g. NaTFSI salt/(DOL+DME) solvents) in relation to the sodium salt molecular ratio x.
Figure 7:
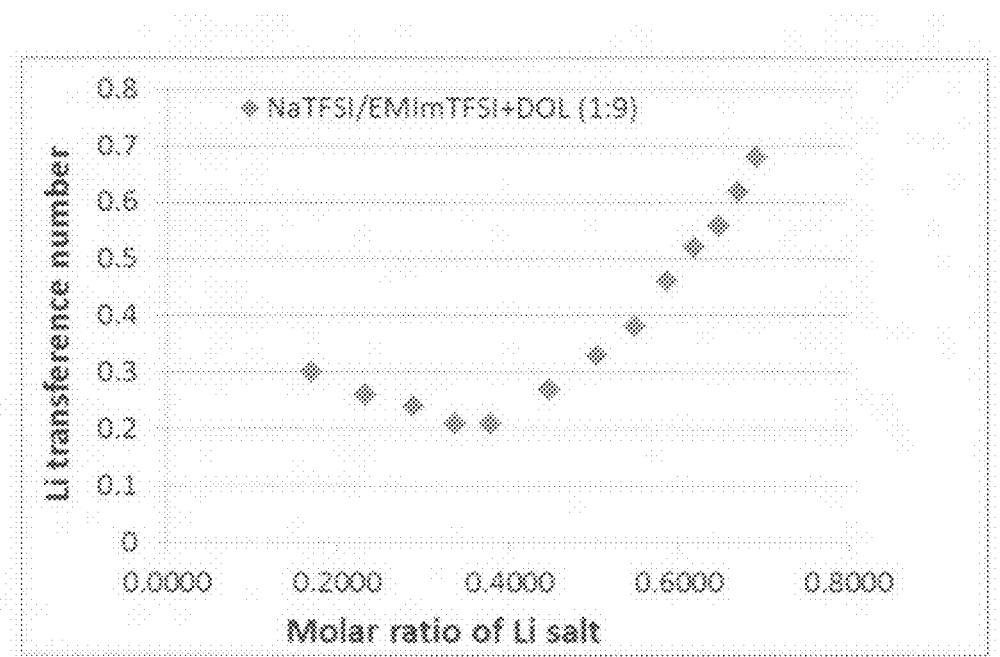
FIG. 7 The Na$^+$ ion transference numbers of electrolytes (e.g. NaTFSI salt/(EMImTFSI+DOL) solvents) in relation to the sodium salt molecular ratio x.
Figure 8:
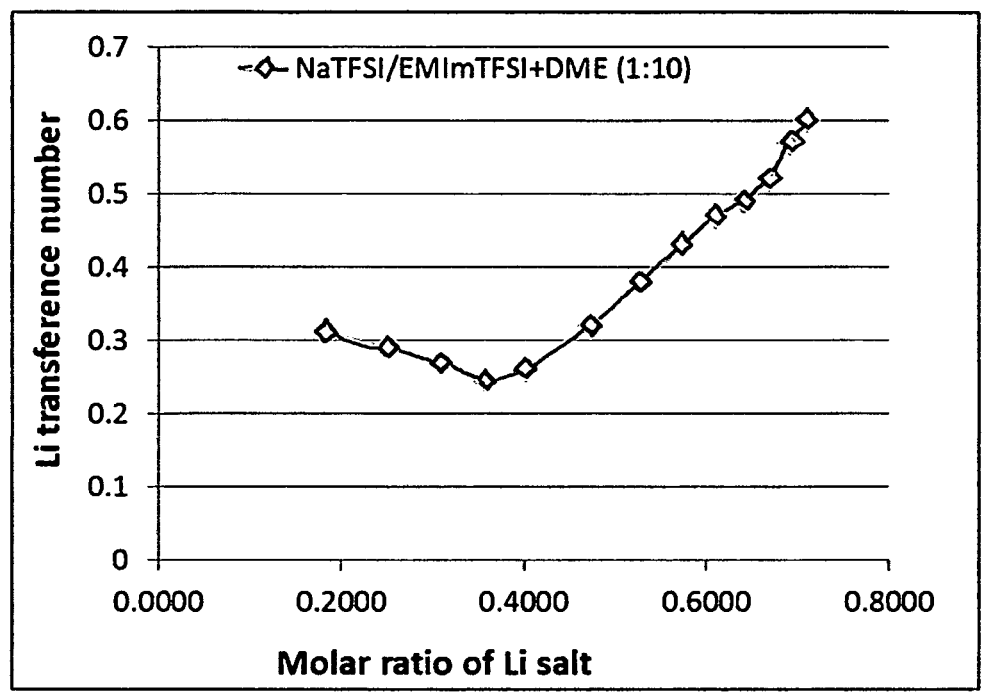
FIG. 8 The Na$^+$ ion transference numbers of electrolytes (e.g. NaTFSI salt/(EMImTFSI+DME) solvents) in relation to the sodium salt molecular ratio x.
Figure 9:
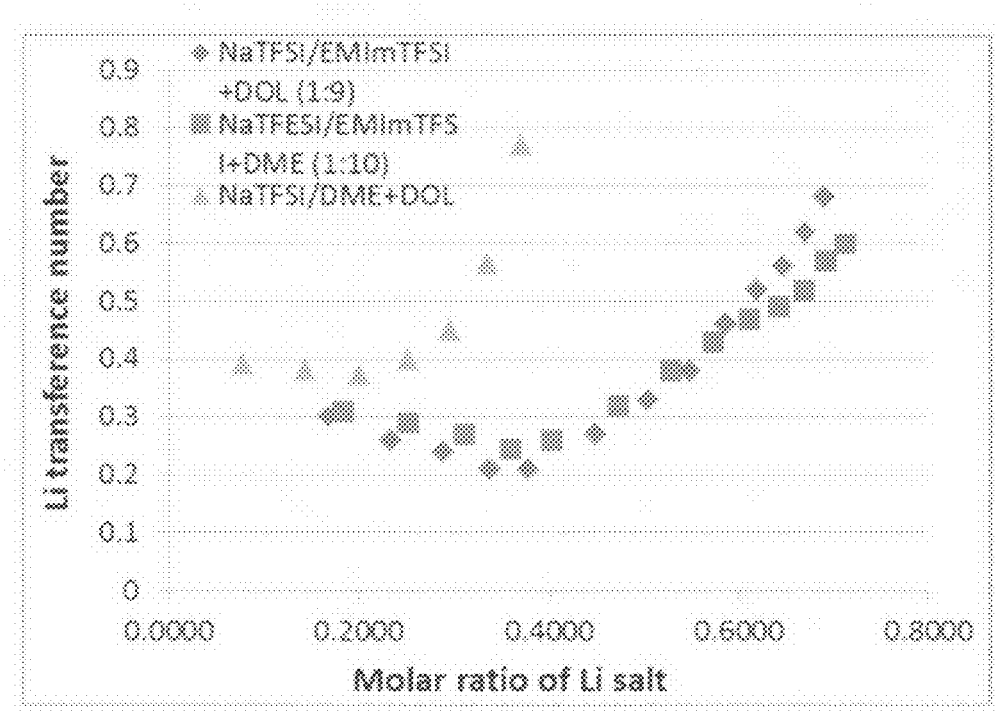
FIG. 9 The Na$^+$ ion transference numbers in various electrolytes (as in FIG. 6-8) in relation to the sodium salt molecular ratio x.

The present invention provides a non-flammable electrolyte and a safe and high-performing rechargeable sodium or potassium metal battery featuring such an electrolyte. A high degree of safety is imparted to this battery by a novel and unique electrolyte that is essentially non-flammable and would not initiate a fire or sustain a fire and, hence, would not pose explosion danger. This invention has solved the very most critical issue that has plagued the non-lithium alkali metal, lithium-metal and lithium-ion industries for more than two decades.

The inventive cell comprises a cathode having a cathode active material and an optional conductive cathode-supporting structure, an anode having an anode active material and an optional conductive supporting nano-structure, a separator electronically separating the anode and the cathode, an organic solvent-based highly concentrated electrolyte in contact with the cathode active material and the anode active material, wherein the electrolyte contains an alkali metal salt dissolved in a first organic liquid solvent with an alkali metal salt molecular ratio sufficiently high so that the electrolyte exhibits a vapor pressure less than 0.01 kPa or less than 0.6

(60%) of the vapor pressure of the solvent alone (when measured at 20° C.), a flash point at least 20 degrees Celsius higher than a flash point of the first organic liquid solvent alone (when no lithium salt is present), a flash point higher than 150° C., or no detectable flash point at all.

Most surprising and of tremendous scientific and technological significance is our discovery that the flammability of any volatile organic solvent can be effectively suppressed provided that a sufficiently high amount of an alkali metal salt is added to and dissolved in this organic solvent to form a solid-like or quasi-solid electrolyte. In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any alkali metal salt dissolved therein, are typically significantly higher.) In many cases, the vapor molecules are practically too few to be detected.

A highly significant observation is that the high solubility of the non-lithium alkali metal salt in an otherwise highly volatile solvent (a large molecular ratio or molar fraction of alkali metal salt, typically >0.2, more typically >0.3, and often >0.4 or even >0.5) has dramatically curtailed the amount of volatile solvent molecules that can escape into the vapor phase in a thermodynamic equilibrium condition. In many cases, this has effectively prevented the flammable solvent gas molecules from initiating a flame even at an extremely high temperature (e.g. using a torch). The flash point of the quasi-solid electrolyte is typically at least 20 degrees (often >50 or >100 degrees) higher than the flash point of the neat organic solvent alone. In most of the cases, either the flash point is higher than 150° C. or no flash point can be detected. The electrolyte just would not catch on fire. Furthermore, any accidentally initiated flame does not sustain for longer than a few seconds. This is a highly significant discovery, considering the notion that fire and explosion concern has been a major impediment to widespread acceptance of battery-powered electric vehicles. This new technology could significantly help accelerate the emergence of a vibrant EV industry.

From the perspective of fundamental chemistry principles, addition of solute molecules to a liquid elevates the boiling temperature of the liquid and reduces its vapor pressure and freezing temperature. These phenomena, as well as osmosis, depend only on the solute concentration and not on its type, and are called colligative properties of solutions. The original Raoult's law provides the relationship between the ratio of the vapor pressure ($p_s$) of a solution to the vapor pressure (p) of the pure liquid and the molar fraction of the solute (x):

$$p_s/p = e^{-x} \quad \text{Eq. (1a)}$$

For a dilute solution, x<<1 and, hence, $e^{-x} \approx 1-x$. Thus, for the special cases of low solute molar fractions, one obtains a more familiar form of Raoult's law:

$$p_s/p = 1-x \quad \text{Eq. (1b)}$$

In order to determine if the classic Raoult's law can be used to predict the vapor pressures of highly concentrated electrolytes, we proceeded to investigate a broad array of alkali metal salt/organic solvent combinations. Some of the examples of our research results are summarized in FIG. 2-FIG. 5, where the experimental $p_s/p$ values are plotted as a function of the molecular ratio (molar fraction, x) for several salt/solvent combinations. Also plotted for comparison purpose is a curve based on the classic Raoult's law, Eq. (1a). It is clear that, for all types of electrolytes, the $p_s/p$ values follow the Raoult's law prediction until the molar fraction x reaches approximately 0.2, beyond which the vapor pressure rapidly drops to essentially zero (barely detectable). When a vapor pressure is lower than a threshold, no flame would be initiated, and the present invention provides an exceptional platform materials chemistry approach to effectively suppress the initiation of flame.

Although deviations from Raoult's law are not uncommon in science, this type of curve for the $p_s/p$ values has never been observed for any binary solution systems. In particular, there has been no study reported on the vapor pressure of ultra-high concentration battery electrolytes (with a high molecular fraction, e.g. >0.2 or >0.3, of alkali metal salt) for safety considerations. This is truly unexpected and of utmost technological and scientific significance.

Another surprising element of the present invention is the notion that we are able to dissolve a high concentration of an alkali metal salt in just about every type of commonly used battery-grade organic solvent to form a quasi-solid electrolyte suitable for use in a rechargeable alkali metal battery. Expressed in a more easily recognizable term, this concentration is typically greater than 2.5 M (mole/liter), more typically and preferably greater than 3.5 M, still more typically and preferably greater than 5 M, further more preferably greater than 7 M, and most preferably greater than 10 M. Such a high concentration of alkali metal salt in a solvent has not been generally considered possible. However, the vapor pressure of a solution cannot be predicted directly and straightforwardly from the concentration value in terms of M (mole/liter). Instead, for an alkali metal salt, the molecular ratio x in Raoult's law is the sum of the molar fractions of positive ions and negative ions, which is proportional to the degree of dissociation of a metal salt in a particular solvent at a given temperature. The mole/liter concentrations do not provide adequate information to enable prediction of vapor pressures.

In general, it has not been possible to achieve such a high concentration of alkali metal salt (e.g., x=0.3-0.7) in an organic solvent used in a battery electrolyte. After an extensive and in-depth study, we came to further discover that the apparent solubility of an alkali metal salt in a particular solvent could be significantly increased if (a) a highly volatile co-solvent is used to increase the amount of alkali metal salt dissolved in the solvent mixture first and then (b) this volatile co-solvent is partially or totally removed once the dissolution procedure is completed. Quite unexpectedly, the removal of this co-solvent typically did not lead to precipitation or crystallization of the alkali metal salt out of the solution even though the solution would have been in a highly supersaturated state. This novel and unique approach appears to have produced a material state wherein most of the solvent molecules are captured or held in place by the alkali metal salt ions that are not volatile (actually the lithium salt being like a solid). Therefore, very few volatile solvent molecules are able to escape into the vapor phase and, hence, very few "flammable" gas molecules are present to help initiate or sustain a flame. This has not been suggested as technically possible or viable in the prior art of Na, K, or even Li metal batteries.

Furthermore, a skilled artisan in the field of chemistry or materials science would have anticipated that such a high salt concentration should make the electrolyte behave like a solid with an extremely high viscosity and, hence, this electrolyte should not be amenable to fast diffusion of alkali metal ions therein. Consequently, the artisan would have expected that an alkali metal battery containing such a solid-like electrolyte would not and could not exhibit a high capacity at a high charge-discharge rate or under a high current density condition (i.e. the battery should have a poor rate capability). Contrary to these expectations by a person of ordinary skills or even exceptional skills in the art, all the alkali metal cells containing such a quasi-solid electrolyte deliver high energy density and high power density for a long cycle life. It appears that the quasi-solid electrolytes as herein invented and disclosed are conducive to facile alkali metal ion transport. This surprising observation is likely due to two major factors: one related to the internal structure of the electrolyte and the other related to a high $Na^+$ or $K^+$ ion transference number (TN), to be further explained in a later section of this specification.

Not wishing to be bound by theory, but one can visualize the internal structure of three fundamentally different types of electrolytes by referring to FIG. 1(a)-(c). FIG. 1(a) schematically shows the closely packed, highly ordered structure of a typical solid electrolyte, wherein there is little free volume for diffusion of alkali metal ions. Migration of any ions in such a crystal structure is very difficult, leading to an extremely low diffusion coefficient ($10^{-16}$ to $10^{-12}$ $cm^2/sec$) and extremely low ion conductivity (typically from $10^{-7}$ S/cm to $10^{-4}$ S/cm). In contrast, as schematically shown in FIG. 1(b), the internal structure of liquid electrolyte is totally amorphous, having large fractions of free volume through which cations (e.g. Na+) can easily migrate, leading to a high diffusion coefficient ($10^{-8}$ to $10^{-6}$ $cm^2/sec$) and high ion conductivity (typically from $10^{-3}$ S/cm to $10^{-2}$ S/cm). However, liquid electrolyte containing a low concentration of alkali metal salt is also flammable and prone to dendrite formation, posing fire and explosion danger. Schematically shown in FIG. 1(c) is the randomized or amorphous structure of a quasi-solid electrolyte having solvent molecules separating salt species to produce amorphous zones for easy migration of free (un-clustered) cations. Such a structure is amenable to achieving a high ion conductivity value (typically $10^{-4}$ S/cm to $8 \times 10^{-3}$ S/cm), yet still maintaining non-flammability. There are relatively few solvent molecules and these molecules are being retained (prevented from vaporizing) by overwhelmingly large numbers of salt species.

As a second factor, we have found that the quasi-solid electrolytes provide a TN greater than 0.3 (typically in the range of 0.4-0.8), in contrast to the typical values of 0.1-0.2 in all lower concentration electrolytes (e.g. <2.0 M; 1 M in most cases) used in all current Na-ion cells. As indicated in FIG. 6-9, the $Na^+$ ion transference number in low salt concentration electrolytes decreases with increasing concentration from x=0 to x=0.2-0.35. However, beyond molecular ratios of x=0.2-0.35, the transference number increases with increasing salt concentration, indicating a fundamental change in the $Na^+$ or $K^+$ ion transport mechanism. Again, not wishing to be bound by theory, we would like to offer the following scientifically plausible explanations: When $Na^+$ ions travel in a low salt concentration electrolyte (e.g. x<0.2), each $Na^+$ ion drags one or more solvating molecules along with it. The coordinated migration of such a cluster of charged species can be further impeded if the fluid viscosity is increased (i.e. when more salt is added to the solvent).

Fortunately, when an ultra-high concentration of Na salt (e.g., with x>0.3) is present, $Na^+$ ions could significantly out-number the available solvating species or solvent molecules that otherwise could cluster the lithium ions, forming multi-member complex species and slowing down the diffusion process of $Na^+$ ions. This high $Na^+$ ion concentration makes it possible to have more "free $Na^+$ ions" (those acting alone without being clustered), thereby providing a high $Na^+$ transference number (hence, a facile $Na^+$ transport). In other words, the sodium ion transport mechanism changes from a multi-ion complex-dominating one (with a larger hydrodynamic radius) to single ion-dominating one (with a smaller hydrodynamic radius) having a large number of available free $Na^+$ ions. This observation has further asserted that $Na^+$ ions can operate on quasi-solid electrolytes without compromising the rate capability of a Na metal cell. Yet, these highly concentrated electrolytes are non-flammable and safe. These combined features and advantages for battery applications have never been taught or even slightly hinted in any previous report. Theoretical aspects of ion transference number of quasi-solid electrolytes are now presented below:

In selecting an electrolyte system for a battery, the ionic conductivity of lithium ions is an important factor to consider. The ionic conductivity of $Na^+$ ions in an organic liquid-based electrolyte is on the order of $10^{-3}$-$10^{-2}$ S/cm and that in a solid state electrolyte is typically in the range of $10^{-7}$-$10^{-4}$ S/cm. Due to the low ionic conductivity, solid-state electrolytes have not been used to any significant extent in any battery system. This is a pity since solid-state electrolyte is resistant to dendrite penetration in an alkali metal secondary cell. In contrast, the ionic conductivity of our quasi-solid electrolytes is typically in the range of $10^{-4}$-$8 \times 10^{-3}$ S/cm, sufficient for use in a rechargeable battery.

The ion mobility or diffusion coefficient is not the only important transport parameter of a battery electrolyte. The individual transference numbers of cations and anions are also important. For instance, when viscous liquids are used as electrolytes in alkali metal batteries, the ion mobility is reduced. Thus, high transference numbers of alkali metal ions in the electrolyte are needed in order to achieve a high ionic conductivity.

The ion transport and diffusion in a liquid electrolyte consisting of only one type of cation (i.e. $Na^+$) and one type of anion, plus a liquid solvent or a mixture of two liquid solvents, may be studied by means of AC impedance spectroscopy and pulsed field gradient NMR techniques. The AC impedance provides information about the overall ionic conductivity, and NMR allows for determination of the individual self-diffusion coefficients of cations and anions. Generally, the self-diffusion coefficients of the cations are slightly higher than those of the anions. It is found that the Haven ratio obtained from the diffusion coefficients and the overall ionic conductivity is typically in the range from 1.3 to 2, indicating that transport of ion pairs or ion complexes (e.g. clusters of Nat-solvating molecules) is an important feature in electrolytes containing a low salt concentration.

The situation becomes more complicated when either two different alkali metal salts or one ionic liquid (as an alkali metal salt or as a liquid solvent) is added to the electrolyte, resulting in a solution having at least 3 or 4 types of ions. In this case, as an example, it is advantageous to use an alkali metal salt containing the same anion as in the solvating ionic liquid, since the amount of dissolvable alkali metal salt is higher than in a mixture with dissimilar anions. Thus, the next logical question to ask is whether it is possible to improve the $Na^+$ (or $K^+$) transference number by dissolving more sodium (or potassium) salt in liquid solvent.

The relation between the overall ionic conductivity of a three-ion liquid mixture, $\tau_{dc}$, and the individual diffusion coefficients of the ions, Di, may be given by the Nernst-Einstein equation:

$$\tau_{dc} = (e^2/k_B T H_R)[(N_{Na^+}(D_{Na^+}) + (N_{E^+})(D_{E^+}) + (N_{B^-})(D_{B^-})] \qquad \text{Eq. (2)}$$

Here, e and $k_B$ denote the elementary charge and Boltzmann's constant, respectively, while $N_i$ are the number densities of individual ions ($Na^+$, $K^+$, $ClO_4^-$, etc.) The Haven ratio, $H_R$, accounts for cross correlations between the movements of different types of ions.

Simple ionic liquids with only one type of cation and anion are characterized by Haven ratios being typically in the range from 1.3 to 2.0. A Haven ratio larger than unity indicates that ions of dissimilar charges move preferentially into the same direction (i.e. ions transport in pairs or clusters). Evidence for such ion pairs can be found using Raman spectra of various electrolytes. The values for the Haven ratios in the three-ion mixtures are in the range from 1.6 to 2.0. The slightly higher $H_R$ values as compared to the electrolytes with x=0 indicate that pair formation is more prominent in the mixtures.

For the same mixtures, the overall ionic conductivity of the mixtures decreases with increasing alkali metal salt content x. This conductivity drop is directly related to a drop of the individual self-diffusion coefficients of all ions. Our studies on different mixtures of ionic liquids with alkali metal salts have shown that the viscosity increases with increasing salt content x. These findings suggest that the addition of alkali metal salt leads to stronger ionic bonds in the liquid mixture, which slow down the liquid dynamics. This is possibly due to the Coulomb interaction between the small sodium (or potassium) ions and the anions being stronger than the Coulomb interactions between the larger organic cations and the anions. Thus, the decrease of the ionic conductivity with increasing alkali metal salt content x is not due to a decreasing number density of mobile ions, but to a decreasing mobility of the ions.

In order to analyze the individual contributions of the cations and anions to the overall ionic conductivity of the mixtures, one may define the apparent transference numbers $t_i$ by:

$$t_i = N_i D_i / (\Sigma N_i D_i) \qquad \text{Eq. (3)}$$

As an example, in a mixture of N-butyl-N-methyl-pyrrolidinium bis(trifluoromethanesulfonyl)imide (BMP-TFSI) and sodium bis(trifluoromethanesulfonyl)imide (Na-TFSI), containing $Na^+$, $BMP^+$, and $TFSI^-$ ions, the apparent lithium transference number $t_{Li}$ increases with increasing Na-TFSI content; at x=0.34, $t_{Na}$=0.242 (vs. $t_{Na}$<0.1 at x<0.2), $D_{Na} \approx 0.7 D_{TFSI}$, and $D_{BMP} \approx 1.6 D_{TFSI}$. The main reason for the higher apparent $Na^+$ transference number in the mixture is the higher number density of $Na^+$ ions.

In order to further enhance the sodium transference number in such mixtures, the number density and/or the diffusion coefficient of the sodium ions have to be further increased relative to the other ions. One would expect a further increase of the $Na^+$ ion number density to be very challenging since the mixtures would tend to undergo salt crystallization or precipitation at high Na salt contents. The present invention has overcome this challenge. We have surprisingly observed that the addition of a very small proportion of a highly volatile organic liquid (e.g. an ether-based solvent) can significantly increase the solubility limit of some Na or K salt in a highly viscous organic liquid (e.g. VC) or an ionic liquid (e.g. typically from x<0.2 to x>0.3-0.6, or from typically from 1 M to >5 M). This can be achieved with an ionic liquid (or viscous organic liquid)-to-volatile organic solvent ratio as high as 10:1, hence, keeping the volatile solvent content to a bare minimum and minimizing the potential flammability of the electrolyte.

The diffusion coefficients of the ions, as measured in the pulsed field gradient NMR (PFG-NMR) experiments, depend on the effective radius of the diffusing entities. Due to the strong interactions between $Na^+$ ions and $TFSI^-$ ions, $Na^+$ ions can form $[Na(TFSI)_{n+1}]^{n-}$ complexes. Coordination numbers up to n+1=4 for alkali metal ions have been observed. The coordination number determines the effective hydrodynamic radius of the complex and thus the diffusion coefficient in the liquid mixture. The Stokes-Einstein equation, $D_i = k_B T/(c\pi\eta r_i)$, may be used to calculate the effective hydrodynamic radius of a diffusing entity, $r_i$, from its diffusion coefficient $D_i$. The constant c varies between 4 and 6, depending on the shape of the diffusing entity. A comparison of the effective hydrodynamic radii of cations and anions in ionic liquids with their van der Waals radii reveals that the c values for cations are generally lower than for anions. In the case of EMI-TFSI/Na-TFSI mixtures, hydrodynamic radii for Na are in the range of 0.9-1.3 nm. This is approximately the van der Waals radius of $[Na(TFSI)_2]^-$ and $[Na(TFSD_3]^{2-}$ complexes. In the case of the BMP-TFSI/Na-TFSI mixture with x=0.34, the effective hydrodynamic radius of the diffusing sodium complex is $r_{Na}=(D_{BMP}/D_{Na})r_{BMP} \approx 1.3$ nm, under the assumption that $r_{BMP} \approx 0.55$ nm and that the c values for $BMP^+$ and for the diffusing Na complex are identical. This value for $r_{Na}$ suggests that the sodium coordination number in the diffusing complex is at least 2 in the mixtures containing a low salt concentration.

Since the number of TFSF ions is not high enough to form a significant amount of $[Na(TFSI)_3]^{2-}$ complexes, most sodium ions should be diffusing as $[Na(TFSI)_2]^-$ complexes. If, on the other hand, higher Na salt concentrations are achieved without crystallization (e.g. in our quasi-solid electrolytes), then the mixtures should contain a considerable amount of neutral [Na(TFSI)] complexes, which are smaller ($r_{[Na(TFSI)]} \approx 0.5$ nm) and should have higher diffusivities. Thus, a higher salt concentration would not only enhance the number density of sodium ions but should also lead to higher diffusion coefficients of the diffusing sodium complexes relative to the organic cations. The above analysis is applicable to electrolytes containing either organic liquid solvents or ionic liquid solvents. In all cases, when the alkali metal salt concentrations are higher than a threshold, there will be an increasing number of free or un-clustered alkali metal ions to move between the anode and the cathode when the concentration is further increased, providing an adequate amount of alkali metal ions required for intercalation/deintercalation or chemical reactions at the cathode and the anode.

In addition to the non-flammability and high alkali metal ion transference numbers as discussed above, there are several additional benefits associated with using the presently invented quasi-solid electrolytes. As one example, the quasi-solid electrolyte can significantly enhance cyclic and safety performance of rechargeable alkali metal batteries through effective suppression of dendrite growth. It is generally accepted that dendrites start to grow in the non-aqueous liquid electrolyte when the anion is depleted in the vicinity of the electrode where plating occurs. In the ultrahigh concentration electrolyte, there is a mass of anions to keep the balance of cations ($Na^+$) and anions near metallic sodium anode. Further, the space charge created by anion depletion is minimal, which is not conducive to dendrite growth. Furthermore, due to both ultrahigh Na salt concentration and high Na-ion transference number, the quasi-solid electrolyte provides a large amount of available sodium-ion flux and raises the sodium ionic mass transfer rate between the electrolyte and the sodium electrode, thereby enhancing the sodium deposition uniformity and dissolution during charge/discharge processes. Additionally, the local high viscosity induced by a high concentration will increase the pressure from the electrolyte to inhibit dendrite growth, potentially resulting in a more uniform deposition on the surface of the anode. The high viscosity could also limit anion convection near the deposition area, promoting more uniform deposition of sodium ions. These reasons, separately or in combination, are believed to be responsible for the notion that no dendrite-like feature has been observed with any of the large number of rechargeable alkali metal cells that we have investigated thus far.

The second embodiment of the present invention is a rechargeable alkali metal cell selected from a sodium metal secondary cell, a sodium-ion cell, a potassium metal secondary cell, a potassium-ion cell, a combination thereof, or a hybrid cell. The rechargeable lithium cell comprises a cathode having a cathode active material, an anode having an anode active material, a porous separator separating the anode and the cathode, a non-flammable quasi-solid electrolyte in contact with the cathode and the anode, wherein the electrolyte contains an alkali metal salt dissolved in a first organic liquid solvent with a concentration sufficiently high so that the electrolyte exhibits a vapor pressure less than 0.01 kPa when measured at 20° C., a flash point at least 20 degrees Celsius higher than a flash point of said first organic liquid solvent alone, a flash point higher than 150° C., or no flash point, wherein the alkali metal salt concentration x is greater than 0.2. The rechargeable alkali metal cell preferably contains a quasi-solid electrolyte having an alkali metal ion transference number greater than 0.4, preferably and typically greater than 0.6, and most preferably and typically greater than 0.7.

The first organic liquid solvent may be selected from the group consisting of 1,3-dioxolane (DOL), 1,2-dimethoxy-ethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether (e.g. methyl perfluorobutyl ether, MFE, or ethyl perfluorobutyl ether, EFE), and combinations thereof.

The non-flammable quasi-solid electrolyte contains a non-lithium alkali metal salt preferably selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), bis-trifluoromethyl sulfonylimide potassium ($KN(CF_3SO_2)_2$), an ionic liquid salt, or a combination thereof.

The electrolyte may further contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present invention. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based sodium salts (not solvent) may be composed of sodium ions as the cation and bis(trifluoromethanesulphonypimide, bis(fluorosulphonyl)imide or hexafluorophosphate as anions. For instance, sodium trifluoromethanesulfonimide (NaTFSI) is a particularly useful sodium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

In the rechargeable alkali metal cell, the cathode active material may contain a sodium intercalation compound selected from $NaFePO_4$ (Sodium iron phosphate), $Na_{0.7}FePO_4$, $Na_{1.5}VOPO_4F_{0.5}$, $Na_3V_2(PO_4)_3$, $Na_3V2(PO_4)_2F_3$, $Na_2FePO_4F$, $NaFeF_3$, $NaVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$ (Sodium cobalt oxide), $Na_{2/3}[Ni_{1/3}Mn_{2/3}]O_2$, $Na_x(Fe_{1/2}Mn_{1/2})O_2$, $Na_xMnO_2$ (Sodium manganese bronze), $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$ (Copper and nickel hexacyanoferrate), NiHCF (nickel hexacyanoferrate), $Na_xCoO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_yS_z$ (Selenium and Selenium/Sulfur, z/y from 0.01 to 100), Se (without S), Alluaudites, or a combination thereof.

Alternatively, the cathode active material may be selected from a functional material or nano-structured material having an alkali metal ion-capturing functional group or alkali metal ion-storing surface in direct contact with the electrolyte. Preferably, the functional group reversibly reacts with an alkali metal ion, forms a redox pair with an alkali metal ion, or forms a chemical complex with an alkali metal ion. The functional material or nano-structured material may be selected from the group consisting of (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nano-fiber, nano-wire, metal oxide nano-wire or fiber, conductive polymer nano-fiber, or a combination thereof; (e) a carbonyl-containing organic or polymeric molecule; (f) a functional material containing a carbonyl, carboxylic, or amine group; and combinations thereof.

The functional material or nano-structured material may be selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$(Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. Desirably, the functional material or nano-structured material has a functional group selected from —COOH, =O, —$NH_2$, —OR, or —COOR, where R is a hydrocarbon radical.

In a preferred embodiment, the functional material or nano-structured material has a specific surface area of at least 500 m²/g, preferably at least 1,000 m²/g.

In the rechargeable alkali metal, the anode may contain an alkali ion source selected from an alkali metal, an alkali metal alloy, a mixture of alkali metal or alkali metal alloy with an alkali intercalation compound, an alkali element-containing compound, or a combination thereof.

Particularly desired is an anode active material that contains an alkali intercalation compound selected from petroleum coke, carbon black, amorphous carbon, hard carbon, templated carbon, hollow carbon nanowires, hollow carbon sphere, titanates, $NaTi_2(PO_4)_3$, $Na_2Ti_3O_7$ (Sodium titanate), $Na_2C_8H_4O_4$ (Disodium Terephthalate), $Na_2TP$ (Sodium Terephthalate), $TiO_2$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In general, the alkali intercalation compound or alkali-containing compound may be selected from the following groups of materials: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and (d) Sodium or potassium salts.

Typically, the cathode active materials are not electrically conducting. Hence, in one embodiment, the cathode active material may be mixed with a conductive filler, such as carbon black (CB), acetylene black (AB), graphite particles, expanded graphite particles, activated carbon, meso-porous carbon, meso-carbon micro bead (MCMB), carbon nano-tube (CNT), carbon nano-fiber (CNF), graphene sheet (also referred to as nano graphene platelet, NGP), carbon fiber, or a combination thereof. These carbon/graphite/graphene materials may be made into a form of fabric, mat, or paper for supporting the cathode active material.

In a preferred embodiment, the nano-scaled filaments (e.g. CNTs, CNFs, and/or NGPs) are formed into a porous nano-structure that contains massive surfaces to support either the anode active material (e.g. Na or K coating) or the cathode active material (e.g. $NaFePO_4$). The porous nano-structure should have pores having a pore size preferably from 2 nm to 50 nm, preferably 2 nm-10 nm. These pores are properly sized to accommodate the electrolyte at the cathode side and to retain the cathode active material in the pores during repeated charges/discharges. The same type of nano-structure may be implemented at the anode side to support the anode active material.

Exfoliated graphite worms, as a cathode active material, can be obtained from the intercalation and exfoliation of a laminar graphite material. The conventional process for producing exfoliated graphite worms typically begins with subjecting a graphitic material to a chemical treatment (intercalation and/or oxidation using a strong acid and/or oxidizing agent) to form a graphite intercalation compound (GIC) or graphite oxide (GO). This is most often accomplished by immersing natural graphite powder in a mixture of sulfuric acid, nitric acid (an oxidizing agent), and another oxidizing agent (e.g. potassium permanganate or sodium chlorate). The resulting GIC is actually some type of graphite oxide (GO) particles. This GIC is then repeatedly washed and rinsed in water to remove excess acids, resulting in a graphite oxide suspension or dispersion, which contains discrete and visually discernible graphite oxide particles dispersed in water. There are different processing routes that can be followed after this rinsing step to form different types of graphite or graphene products.

For instance, a first route involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid expansion by a factor of 30-800 to form "graphite worms", which are each a collection of exfoliated, but largely un-separated or still interconnected graphite flakes.

As a second route, one may choose to use a low-intensity air mill or shearing machine to simply break up the graphite worms for the purpose of producing the so-called "expanded graphite flakes," which are isolated and separated graphite flakes or platelets thicker than 100 nm (hence, not a nano material by definition). Alternatively, exfoliated graphite worms may be the re-compressed (e.g. roll-pressed) to form flexible graphite sheet or flexible graphite foil that is essentially a solid film not permeable to battery electrolyte. Such an electrolyte-impermeable film can be a good battery current collector (e.g. to replace aluminum foil), but it does not have a sufficient amount of specific surface area to support sulfur.

Alternatively, as a third route, the exfoliated graphite worms may be subjected to high-intensity mechanical shearing (e.g. using an ultrasonicator, high-shear mixer, high-intensity air jet mill, or high-energy ball mill) to form separated single-layer and/or multi-layer graphene sheets (collectively called nano graphene platelets or NGPs), as disclosed in our U.S. application Ser. No. 10/858,814. Single-layer graphene can be as thin as 0.34 nm, while multi-layer graphene can have a thickness up to 100 nm.

The graphite oxide suspension (after a sufficiently high degree of oxidation) may be subjected to ultrasonication for the purpose of separating/isolating individual graphene oxide sheets from graphite oxide particles. This is based on the notion that the inter-graphene plane separation has been increased from 0.335 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets having an oxygen content of typically 20-50% by weight. These graphene oxide sheets can then be chemically or thermally reduced to obtain "reduced graphene oxides" (RGO) typically having an oxygen content of 0.01%-10% by weight, more typically 0.01%-5% by weight, and most typically 0.01%-2% by weight.

In general, NGPs include single-layer and multi-layer graphene or reduced graphene oxide with an oxygen content of 0-10% by weight, more typically 0-5% by weight, and preferably 0-2% weight. Pristine graphene has essentially 0% oxygen. Graphene oxide (including RGO) can have 0.01%-50% by weight of oxygen.

As indicated earlier, dried GIC or GO powder may be exposed to a thermal shock (at a high temperature, typically 800-1,050° C.) for a short period of time (typically 30-120 seconds), allowing the constituent graphite flakes to freely expand. The resulting graphite worms typically have an expanded volume that is 30 to 800 times higher than the original graphite volume, depending upon the degree of oxidation or intercalation.

Typically, an oxygen content between 46-50% by weight based on the total GO weight is an indication of practically complete oxidation of graphite, which is also reflected by the complete disappearance of the X-ray diffraction curve peak originally located at 2θ=approximately 26 degrees for un-intercalated or un-oxidized natural graphite. This diffraction peak at 2θ=approximately 26 degrees corresponds to the $d_{002}$ spacing between two (002) graphene planes.

Acids, such as sulfuric acid, are not the only type of intercalating agent (intercalant) that penetrates into spaces between graphene planes. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc.

A graphite worm is characterized as having a network of largely interconnected exfoliated graphite flaks with pores between flakes. The flakes have a typical length or width dimension of 0.5-100 μM (more typically 1-20 μm), depending upon the types of starting graphitic materials used and these lateral dimensions (length or width) are relatively independent of the GIC stage number (or oxygen content in GO), the exfoliation temperature, and the exfoliation environment. However, these factors have major impact on the volume expansion ratio (exfoliated graphite worm volume vs. starting graphite particle volume), flake thickness range, and pore size range of exfoliated graphite worms.

For instance, Stage-1 GIC or fully oxidized graphite (GO with 40-50% oxygen content), upon un-constrained exfoliation at 1,000° C. for one minute, exhibit a typical volume expansion ratio of approximately 450-800%, flake thickness range of 0.34 to 3 nm, and pore size range of 50 nm to 20 μm. By contrast, Stage-5 GIC or GO with 20-25% oxygen content, upon un-constrained exfoliation at 1,000° C. for one minute, exhibit a volume expansion ratio of approximately 80-180%, flake thickness range of 1.7 to 200 nm, and pore size range of 30 nm to 2 μm.

Stage-1 GIC is the most desirable since it leads to highly exfoliated graphite worms featuring thin graphite flakes with very high specific surface areas (typically >500 m$^2$/g, often >700 m$^2$/g, and even >1,000 m$^2$/g in several cases). Higher surface areas make it possible to deposit thinner cathode active material coating given the same active material volume. Consequently, there is significantly reduced proportion of thicker coating of active material attached to the exfoliated graphite flake surfaces. This could allow most of the active material to be accessible to the alkali metal ions during the cell discharge.

The flakes in an exfoliated graphite worm remain substantially interconnected (physically in contact with each other or bonded to each other), forming a network of electron-conducting paths. Hence, the electrical conductivity of the graphite worms can be relatively high (10-10,000 S/cm), which can be orders of magnitude higher than that of carbon black, activated carbon, polymeric carbon, amorphous carbon, hard carbon, soft carbon, and meso-phase pitch, etc.

The soft and fluffy worms, upon impregnation or coating with a cathode active material, have exhibited an unexpected improvement in mechanical strength (e.g. compression strength or bending strength) by up to 2-3 orders of magnitude. The impregnated graphite worms may be re-compressed to increase their physical density and structural integrity, if deemed necessary.

When the cathode is made, the cathode active material may be embedded in the nano-scaled pores constituted by the exfoliated graphite flakes. Preferably, the cathode active material is grinded into nanometer scale (preferably <10 nm and more preferably <5 nm). Alternatively, the cathode active material may be in a thin-film coating form deposited on surfaces of the graphite flakes obtained by melt impregnation, solution deposition, electro-deposition, chemical vapor deposition (CVD), physical vapor deposition, sputtering, laser ablation, etc. This coating is then brought in contact with electrolyte before, during, or after the cathode is made, or even after the cell is produced.

At the anode side, when an alkali metal is used as the sole anode active material in an alkali metal cell, there is concern about the formation of dendrites, which could lead to internal shorting and thermal runaway. Herein, we have used two approaches, separately or in combination, to addressing this dendrite formation issue: one involving the use of a high-concentration electrolyte and the other the use of a nano-structure composed of conductive nano-filaments to support the alkali metal at the anode. For the latter, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Surprisingly and significantly, the nano-structure provides an environment that is conducive to uniform deposition of alkali metal ions during the battery re-charge, to the extent that no geometrically sharp structures or dendrites were found in the anode after a large number of cycles. Not wishing to be bound by any theory, but the applicants envision that the 3-D network of highly conductive nano-filaments provide a substantially uniform attraction of alkali metal ions back onto the filament surfaces during re-charging. Furthermore, due to the nanometer sizes of the filaments, there is a large amount of surface area per unit volume or per unit weight of the nano-filaments. This ultra-high specific surface area offers the alkali metal ions an opportunity to uniformly deposit an alkali metal coating on filament surfaces at a high rate, enabling high re-charge rates for an alkali metal secondary battery.

A possible alkali metal cell may be comprised of an anode current collector, an electrolyte phase (optionally but preferably supported by a porous separator, such as a porous polyethylene-polypropylene co-polymer film), a cathode containing a cathode active material, and an optional cathode current collector. This cathode current collector is optional because the meso-porous exfoliated graphite structure, if properly designed, can act as a current collector or as an extension of a current collector.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. In several cases, scanning electron microscopy (SEM) and transmission electron microscopy (TEM) were used to characterize the structure and morphology of the hybrid material samples.

A nano-structured cathode, comprising exfoliated graphite worm-sulfur (or polysulfide), was bonded onto an aluminum foil (a current collector). After solvent removal, web-aluminum foil configuration was hot-pressed to obtain a cathode or, alternatively, a complete cell was fabricated by laminating an anode current collector (Cu foil), an anode layer (e.g., a sheet of compacted Na, a nano-structured web with Na or K coating, or hard carbon particles bonded by PVDF), an electrolyte-separator layer, a meso-porous cathode, and a cathode current collector (e.g., stainless steel foil or aluminum foil) all at the same time.

The following examples are presented primarily for the purpose of illustrating the best mode practice of the present invention, not to be construed as limiting the scope of the present invention.

Example 1

Some Examples of Electrolytes Used

Preferred non-lithium alkali metal salts include: sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), and bis-trifluoromethyl sulfonylimide potassium [$KN(CF_3SO_2)_2$], A wide range of lithium salts can be added as a second salt dissolved in an organic liquid solvent (alone or in a mixture with another organic liquid or an ionic liquid), if so desired. The following are good choices for lithium salts that tend to be dissolved well in selected organic or ionic liquid solvents: lithium borofluoride ($LiBF_4$), lithium trifluoro-metasulfonate ($LiCF_3SO_3$), lithium bis-trifluoromethyl sulfonylimide ($LiN(CF_3SO_2)_2$ or LITFSI), lithium bis(oxalato)borate (LiBOB), lithium oxalyldifluoroborate ($LiBF_2C_2O_4$), and lithium bisperfluoroethy-sulfonylimide (LiBETI). A good electrolyte additive for helping to stabilize Li metal is $LiNO_3$. Particularly useful ionic liquid-based lithium salts include: lithium bis(trifluoro methanesulfonyl)imide (LiTFSI).

Preferred organic liquid solvents include: ethylene carbonate (EC), dimethyl carbonate (DMC), methylethyl carbonate (MEC), diethyl carbonate (DEC), propylene carbonate (PC), acetonitrile (AN), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), hydrofloroether (e.g. TPTP), sulfone, and sulfolane.

Preferred ionic liquid solvents may be selected from a room temperature ionic liquid (RTIL) having a cation selected from tetraalkylammonium, di-alkylimidazolium, alkylpyridinium, dialkyl-pyrrolidinium, or dialkylpiperidinium. The counter anion is preferably selected from $BF_4^-$, $B(CN)_4^-$, $CF_3CO_2^-$, $CF_3SO_3^-$, $N(SO_2CF_3)_2^-$, $N(COCF_3)(SO_2CF_3)^-$, or $N(SO_2F)_2^-$. Particularly useful ionic liquid-based solvents include N-n-butyl-N-ethylpyrrolidinium bis(trifluoromethane sulfonyl)imide (BEPyTFSI), N-methyl-N-propylpiperidinium bis(trifluoromethyl sulfonyl)imide ($PP_{13}TFSI$), and N,N-diethyl-N-methyl-N-(2-methoxyethyl) ammonium bis(trifluoromethylsulfonyl)imide.

Example 2

Vapor Pressure of Some Solvents and Corresponding Quasi-Solid Electrolytes with Various Sodium Salt Molecular Ratios Vapor pressures of several solvents (DOL, DME, PC, AN, with or without an ionic liquid-based co-solvent, $PP_{13}TFSI$) before and after adding a wide molecular ratio range of sodium salts, such as sodium borofluoride ($NaBF_4$), sodium perchlorate (NaClO$_4$), or sodium bis(trifluoro methanesulfonyl)imide (NaTFSI), were measured. Some of the vapor pressure ratio data (p$_s$/p=vapor pressure of solution/vapor pressure of solvent alone) are plotted as a function of the lithium salt molecular ratio x, as shown in FIG. 2-5, along with a curve representing the Raoult's Law. In all cases, the vapor pressure ratio follows the theoretical prediction based on Raoult's Law for up to x<0.15 only, above which the vapor pressure deviates from Raoult's Law in a novel and unprecedented manner. It appears that the vapor pressure drops at a very high rate when the molecular ratio x exceeds 0.2, and rapidly approaches a minimal or essentially zero when x exceeds 0.4. With a very low p$_s$/p value, the vapor phase of the electrolyte either cannot ignite or cannot sustain a flame for longer than 3 seconds once initiated.

Example 3

Flash Points and Vapor Pressure of Some Solvents and Corresponding Quasi-Solid Electrolytes with a Sodium or Potassium Salt Molecular Ratio of x=0.3

The flash points and vapor pressures of several solvents and their electrolytes with a Na or K salt molecular ratio x=0.3 are presented in Table 1 below. It may be noted that, according to the OSHA (Occupational Safety & Health Administration) classification, any liquid with a flash point below 38.7° C. is flammable. However, in order to ensure safety, we have designed our quasi-solid electrolytes to exhibit a flash point significantly higher than 38.7° C. (by a large margin, e.g. at least increased by 50° and preferably above 150° C.). The data in Table 1 indicate that the addition of an alkali metal salt to a molecular ratio of 0.35 is normally sufficient to meet these criteria. All our quasi-solid electrolytes are not flammable.

TABLE 1

The flash points and vapor pressures of select solvents and their electrolytes with an alkali salt molecular ratio x = 0.3 (Flash point data for the first 4 liquids are given as points of reference).

| Chemical | Flash point (° C.) | Flash point (° C.) with x = 0.35 of (Li, Na, or K salt) | Vapor pressure (kPa) at 20° C. | Vapor pressure (kPa) at 20° C. with x = 0.35 |
|---|---|---|---|---|
| Acetone | −17 | — | 24 kPa (240 hPa) | — |
| Ethanol | 17 | — | | — |
| Gasoline | −42 | — | | |
| Canola oil | 327 | — | | |
| DOL (1,3-dioxolane) | 1 | 75 (LiBF$_4$) | 9.33 (70 Torr) | 2.6 (LiBF$_4$) |
| | | 82 (KBF$_4$) | | 2.0 (KBF$_4$) |
| DOL | 1 | 155 (LiCF$_3$SO$_3$) | 9.33 | 0.8 (LiCF$_3$SO$_3$) |
| | | 180 (NaCF$_3$SO$_3$) | | 0.6 (LiCF$_3$SO$_3$) |
| DEC (diethyl carbonate) | 33 | >200 (LiCF$_3$SO$_3$) | 1.33 (10 Torr) | 0.09 (LiCF$_3$SO$_3$) |
| DMC (Dimethyl carbonate) | 18 | 177 (LiCF$_3$SO$_3$) | 2.40 (18 Torr) | 0.13 (LiCF$_3$SO$_3$) |
| EMC (ethyl methyl carbonate) | 23 | 188 (LiBOB) | 3.60 (27 Torr) | 0.1 (LiBOB) |
| EC (ethylene carbonate) | 145 | No flash point (LiBOB) | <0.0013 (0.02 Torr at 36.4° C.) | <0.01 (LiBOB) |
| PC (propylene carbonate) | 132 | No flash point (LiBOB) | 0.0173 (0.13 Torr) | <0.01 (LiBOB) |
| γ-BL (gamma-butyrolactone), | 98 | No flash point (LiBOB) | 0.20 (1.5 Torr) | <0.01 (LiBOB) |
| AN (Acetonitrile) | 6 | 85 (LiBF$_4$) | 9.71 (88.8 Torr at 25° C.) | 1.5 (LiBF$_4$) |
| | | 95 (NaBF$_4$) | | 1.2 (NaBF$_4$) |
| EA (Ethyl acetate) + DOL | −3 | 70 (LiBF$_4$) | 9.73 | 1.3 (LiBF$_4$) |
| DME (1,2-dimethoxyethane) | −2 | 66 (LiPF$_6$) | 6.40 (48 Torr) | 2.1 (LiPF$_6$) |
| | | 74 (NaPF$_6$) | | 1.6 (LiPF$_6$) |
| VC (vinylene carbonate) | 53.1 | 155 (LiPF$_6$) | 11.98 (89.9 Torr) | 0.9 (LiPF$_6$) |
| | | 170 (KPF$_6$) | | 0.6 (KPF$_6$) |
| TEGDME (tetraethylene glycol dimethylether) | 141 | No flash point (LiPF$_6$) | <0.0013 (<0.01 Torr) | <0.001 |
| FEC (Fluoro ethylene carbonate) | 122 | No flash point (LiPF$_6$) | 0.021 | <0.01 |
| FPC (Trifluoro propylene carbonate) | No flash point | No flash point (LiPF$_6$) | — | — |
| HFEs (TPTP) hydrofluoro ether | No flash point | No flash point (NaPF$_6$) | 0.7 | <0.1 |
| MFE (methyl nonafluorobutyl ether) | No flash point | No flash point (NaPF$_6$) | — | — |
| IL (1-ethyl-3-methyl imadazolium TFSI) | 283 | No flash point (NaTFSI) | — | — |

\* As per OSHA (Occupational Safety & Health Administration) classification, any liquid with a flash point below 38.7° C. is flammable.
\*\* 1 standard atmosphere = 101,325 Pa = 101.325 kPa = 1,013.25 hPa.
1 Torr = 133.3 Pa = 0.1333 kPa

Example 4

Alkali Metal Ion Transference Numbers in Several Electrolytes

The $Na^+$ ion transference numbers of several types of electrolytes (e.g. NaTFSI salt/(EMImTFSI+DME) solvents) in relation to the lithium salt molecular ratio were studied and representative results are summarized in FIG. 6-9. In general, the $Na^+$ ion transference number in low salt concentration electrolytes decreases with increasing concentration from x=0 to x=0.2-0.35. However, beyond molecular ratios of x=0.2-0.35, the transference number increases with increasing salt concentration, indicating a fundamental change in the $Na^+$ ion transport mechanism. This was explained in the theoretical sub-sections earlier. When $Na^+$ ions travel in a low salt concentration electrolyte (e.g. x<0.2), a $Na^+$ ion can drag multiple solvating molecules along with it. The coordinated migration of such a cluster of charged species can be further impeded if the fluid viscosity is increased due to more salt dissolved in the solvent. In contrast, when an ultra-high concentration of sodium salt with x>0.2 is present, $Na^+$ ions could significantly out-number the available solvating molecules that otherwise could cluster the sodium ions, forming multi-ion complex species and slowing down their diffusion process. This high Na ion concentration makes it possible to have more "free Na ions" (non-clustered), thereby providing a higher $Na^+$ transference number (hence, a facile $Na^+$ transport). The sodium ion transport mechanism changes from a multi-ion complex-dominating one (with an overall larger hydrodynamic radius) to single ion-dominating one (with a smaller hydrodynamic radius) having a large number of available free $Na^+$ ions. This observation has further asserted that an adequate number of $Na^+$ ions can quickly move through or from the quasi-solid electrolytes to make themselves readily available to interact or react with a cathode (during discharge) or an anode (during charge), thereby ensuring a good rate capability of a sodium secondary cell. Most significantly, these highly concentrated electrolytes are non-flammable and safe. Combined safety, facile sodium ion transport, and electrochemical performance characteristics have been thus far difficult to come by for all types of sodium and lithium secondary batteries.

Example 5

Exfoliated Graphite Worms from Natural Graphite Using Hummers Method

Graphite intercalation compound (GIC) was prepared by intercalation and oxidation of natural graphite flakes (original size of 200 mesh, from Huadong Graphite Co., Pingdu, China, milled to approximately 15 μm) with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately three hours at 30° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes. Portions of these graphite worms were then subjected to ultrasonication to obtain separated graphene sheets.

Example 6

Conductive Web of Filaments from Electro-Spun PAA Fibrils for Anode

Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain a sample with an average fibril diameter of 67 nm. Such a web can be used to accommodate a cathode active material such as $NaFePO_4$ for the cathode and/or as a conductive substrate for an anode active material.

Example 7

Preparation of NGP-Based Webs (Webs of NGPs and NGPs+CNFs) for the Anode or Cathode (as a Conductive Nanostructured Support)

The starting natural graphite flakes (original size of 200 mesh, from Huadong Graphite Co., Pingdu, China) was milled to approximately 15 The intercalation and oxidation chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite particles (20 g) were added under vigorous stirring to avoid agglomeration. After the graphite particles were well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite sample was quickly placed in a tube furnace preheated to 1,000° C. and allowed to stay inside a quartz tube for approximately 40 seconds to obtain exfoliated graphite worms. The worms were dispersed in water to form a suspension, which was ultrasonicated with a power of 60 watts for 15 minutes to obtain separated graphene sheets (NGPs).

Approximately half of the NGP-containing suspension was filtered and dried to obtain several paper-like mats. Vapor grown CNFs were then added to the remaining half to form a suspension containing both NGPs and CNFs (20%), which was dried and made into several paper-like mats. Approximately 5% phenolic resin binder was used to help consolidate the web structures in both samples. Such a web can be as a conductive substrate for an anode active material.

Example 8

Cathode Active Materials Based on Mixed Transition Metal Oxides

As examples, for the synthesis of $Na_{1.0}Li_{0.2}Ni_{0.25}Mn_{0.75}O_8$, $Ni_{0.25}Mn_{0.75}CO_3$, or $Ni_{0.25}Mn_{0.75}(OH)_2$ cathode active material, $Na_2CO_3$, and $Li_2CO_3$ were used as starting compounds: Materials in appropriate mole ratios were ground together and heat-treated; first at 500° C. for 8 h in air, then finally at 800° C. for 8 h in air, and furnace cooled. For electrode preparation, a sheet of aluminum foil was coated with N-methylpyrrolidinone (NMP) slurry of the cathode mixture. The electrode is composed of 82 wt % active oxide material, 8 wt % conductive carbon black (Timcal Super-P Li), and 10 wt % PVDF binder (Kynar). After casting, the electrode was initially dried at 70° C. for 2 h, followed by dynamic vacuum drying at 80° C. for at least 6 h. The sodium metal foil was cut from sodium chunks (Aldrich, 99%) that were cleaned of any oil using hexanes, then rolled and punched out.

The electrolyte was propylene carbonate with 1 M-7 M of $NaClO_4$ electrolyte salt (Aldrich, 99%). Coin cells were galvanostatically cycled to a cutoff of 4.2 V vs. Na/Na$^+$ (15 mA/g) and then discharged at various current rates to a cutoff voltage of 2.0 V.

In all battery cells prepared, charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined, but excluding the current collector). The specific charge capacity refers to the amount of charges per unit mass of the composite cathode. The specific energy and specific power values presented in this section are based on the total cell weight for all pouch cells. The morphological or micro-structural changes of selected samples after a desired number of repeated charging and recharging cycles were observed using both transmission electron microscopy (TEM) and scanning electron microscopy (SEM).

Figure 10:
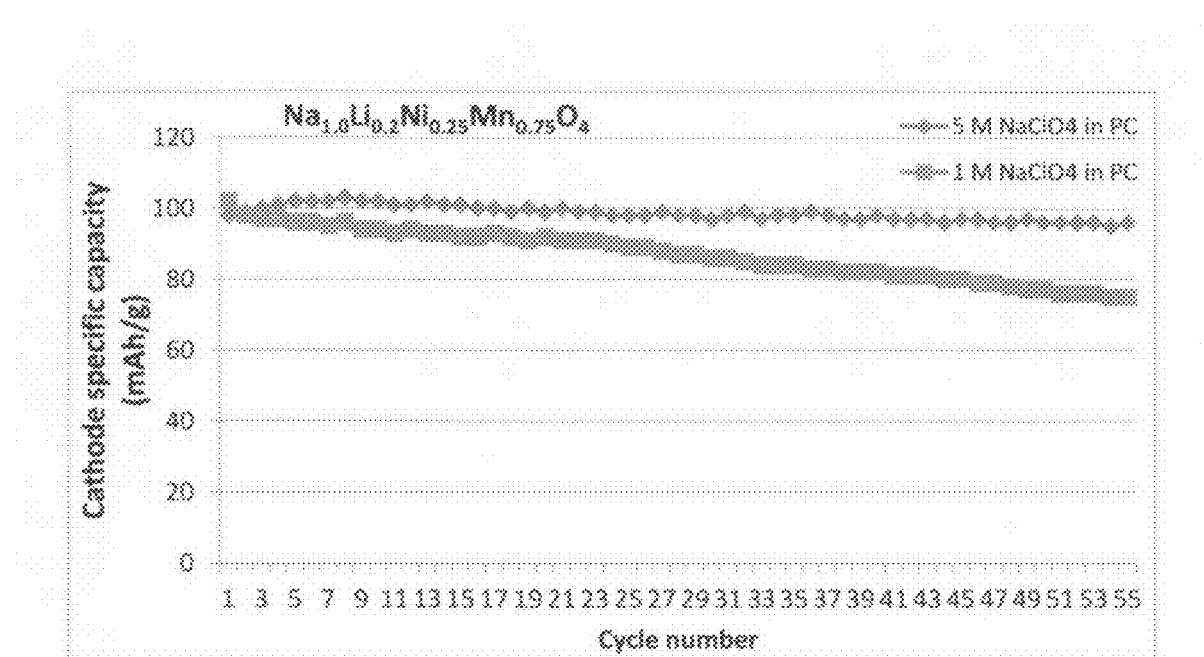
FIG. 10 Cycling behaviors of two Na metal-Na$_{1.0}$Li$_{0.2}$Ni$_{0.25}$Mn$_{0.75}$O$_\delta$ cells containing 5 M and 1 M, respectively, of NaClO$_4$ salt in PC as the electrolyte.

FIG. 10 shows the charge-discharge cycling behaviors of two Na metal cells containing 5 M and 1 M, respectively, of $NaClO_4$ salt in PC as the electrolyte. It is clear that the cell featuring the presently invented quasi-solid electrolyte (5 M) exhibits a much more stable charge-discharge cycling performance, exhibiting a <5% capacity decay after 50 cycles. In contrast, the cell having a low salt concentration suffers a 25% capacity decay after 50 cycles.

Example 9

$Na_3V_2(PO_4)_3/C$ and $Na_3V_2(PO_4)_3$/Graphene Cathodes

The $Na_3V_2(PO_4)_3/C$ sample was synthesized by a solid state reaction according to the following procedure: a stoichiometric mixture of $NaH_2PO_4 \cdot 2H_2O$ (99.9%, Alpha) and $V_2O_3$ (99.9%, Alpha) powders was put in an agate jar as a precursor and then the precursor was ball-milled in a planetary ball mill at 400 rpm in a stainless steel vessel for 8 h. During ball milling, for the carbon coated sample, sugar (99.9%, Alpha) was also added as the carbon precursor and the reductive agent, which prevents the oxidation of V3$^+$. After ball milling, the mixture was pressed into a pellet and then heated at 900° C. for 24 h in Ar atmosphere. Separately, the $Na_3V_2(PO_4)_3$/Graphene cathode was prepared in a similar manner, but with sugar replaced by graphene oxide.

Figure 11:
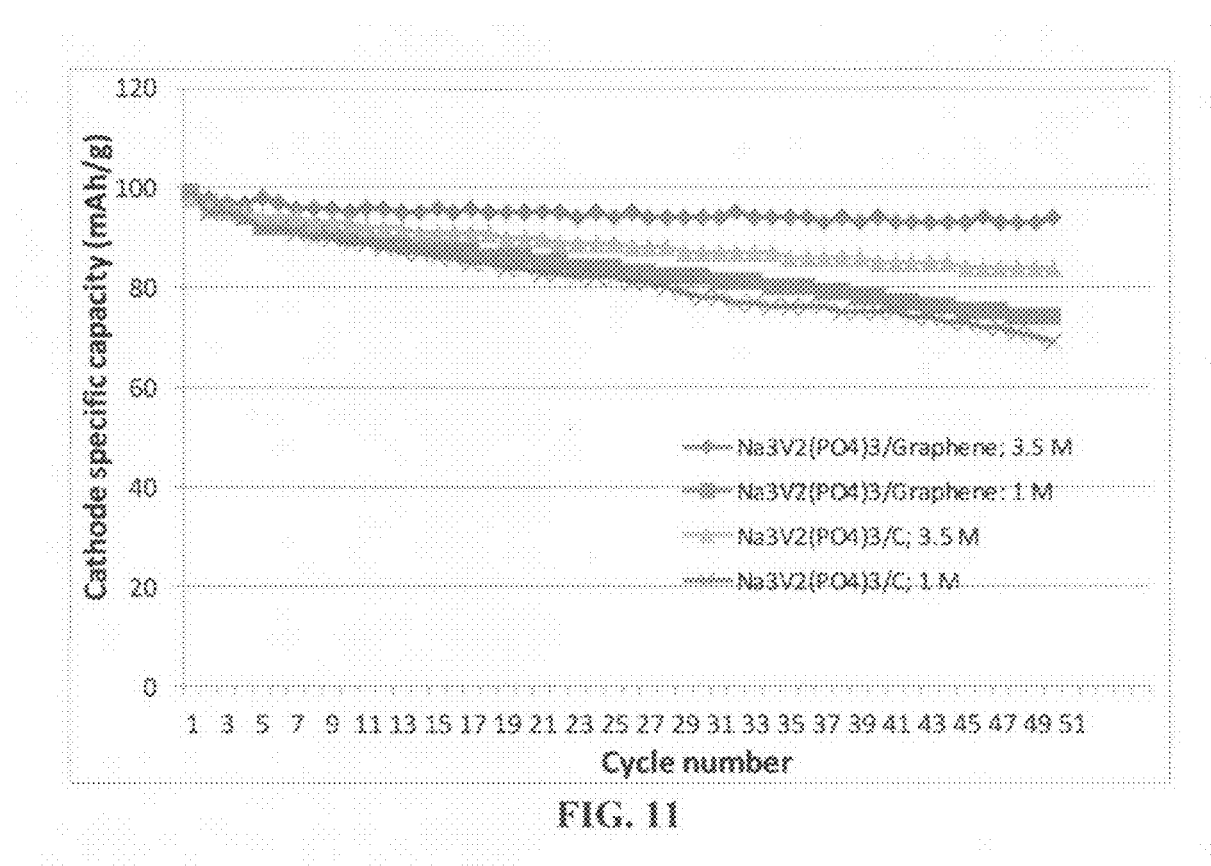
FIG. 11 Cycling stability behaviors of two Na metal-Na$_3$V$_2$(PO$_4$)$_3$ cells containing 3.5 M and 1 M, respectively, of NaPF$_6$ salt in PC+DOL as the electrolyte.

FIG. 11 shows the cycling stability behaviors of two Na metal cells containing 3.5 M and 1 M, respectively, of $NaPF_6$ salt in PC+DOL as the electrolyte. It is clear that the cells featuring the presently invented quasi-solid electrolyte (3.5 M) exhibit a much more stable charge-discharge cycling performance. Given the same salt concentration, the cell containing a nano-structured graphene-supported cathode performs much better in terms of cycling stability and specific capacity.

Example 10

Selenium (Se) and Selenium-Sulfur ($Se_zS$) Cathodes

Composite was prepared by mixing selenium and graphene in a 8:2 mass ratio. High-energy ball milled mixture (1 h) leads to an amorphization of the selenium. The material was pressed into a pellet and heated at 260° C. for 12 h in air. The weight loss of <1% was observed due to the low pressure vapor of Se ($\sim10^{-2}$ torr at 260° C.). The X-ray diffraction curves show that the treatment leads to recrystallization of the selenium.

The graphene supported selenium-sulfur composite was prepared with a slightly modified procedure. $SeS_2$ and graphene were mixed with a 8:2 mass ratio, and treated for 15 minutes using a planetary ball miller. Finally, the mixture was heated at 160° C. for 12 hours under air. The weight loss induced by the thermal treatment was below 1.5%.

Figure 12:
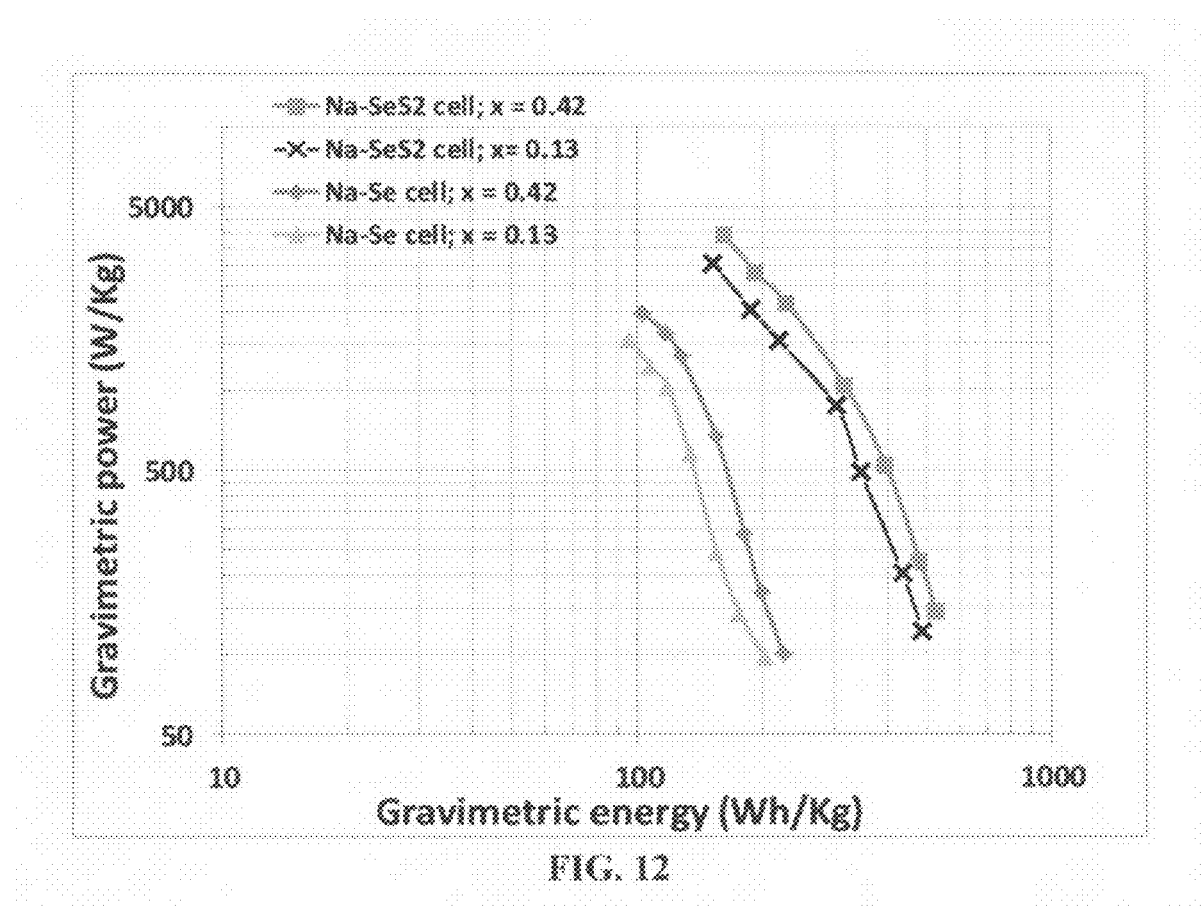
FIG. 12 Ragone plots (cell power density vs. cell energy density) of two Na metal cells (Na—SeS$_2$ and Na—Se) each having a graphene-supported cathode (SeS$_2$ and Se), with the sodium salt concentrations being x=0.13, and 0.41, respectively.

The electrolyte used is $NaCF_3SO_3$ dissolved in DOL+DMC (30/70) with the Na salt molecular ratios of 0.13 and 0.42, respectively, for both the Na—Se cells and the Na—$SeS_2$ cells. The energy density and power density data of these four cells are summarized in the Ragone plots of FIG. 12. There are several significant observations that can be made from these data:

(a) The energy density of the Na—$SeS_2$ cell containing a quasi-solid electrolyte reaches a value of 527 Wh/kg. In contrast, the energy density of lithium-ion cells is typically in the range of 150-200 Wh/g.

(b) The same cell can deliver a maximum power density of 3,844 W/kg, which is one order of magnitude higher than the power density of lithium-ion batteries (typically 300-500 W/kg). This high power density implies a battery capable of being charged and discharged at a high rate. Such a high power density, comparable to those of a supercapacitor, also enables this Na metal battery to be used in situations where pulse power and/or fast energy-capturing capability are required (e.g. for recuperating the kinetic energy of a vehicle during deceleration and providing the required pulse power during acceleration).

(c) A three-fold increase in energy density is also expected to have a highly positive impact to society (e.g. in terms of reducing carbon dioxide emission if EV industry emerges). Currently, the primary barriers against more widespread acceptance of battery-powered EVs by consumers are that the EV batteries are still too expensive and too heavy, and there are very few charge stations available. For instance, the battery in GM Volt is designed to run on the battery for a distance of 40 miles, and Nissan Leaf for 120 miles. These battery-only ranges are clearly not enough for a typical driver who is so accustomed to driving a gasoline-powered car for 300 miles without having to re-fill the gasoline tank. As an alternative, the high-end all electric vehicle (e.g. S-model manufactured by Tesla Motors, Santa Clara, Calif.) operates on a 85-kwh (kilo watt-hour) lithium battery system that can run for 350 miles on one battery charge. However, the battery system weights almost 2,000 pounds, occupies the entire chassis of the car, and costs about $60,000-$75,000 (battery system alone). This battery cost is equivalent to approximately $700-800 per kWh. The US Department of Energy believes that the EV industry cannot be economically viable unless the battery cost goes below $250/kWh.

These high cost and heavy weight problems associated with current lithium-ion batteries are due to a major shortcoming of lithium-ion batteries: low energy density (low amount of energy stored in a given battery weight, resulting in an insufficient battery-only driving distance on one battery charge). To meet this challenging goal, the energy density of an EV battery must be increased from the current 150 Wh/kg to 450 Wh/kg without significantly increasing the battery system costs. This would reduce the battery system cost from approximately $750/kWh to $250/kWh. The presently invented battery system with quasi-solid electrolyte can deliver an energy density three times higher than that of a conventional Li-ion battery at a comparable or reduced cost, leading to a battery system cost of <$250/kWh. Given the same battery system weight, the EV featuring the presently invented Na metal cell can run for 1,000 miles between two battery charges, reducing the need to build extensive charging station infrastructure. Alternatively, with the same 85 kWh of energy, the battery system weight can be reduced to a factor of 3 (e.g. down to <600 pounds or 280 kg). Clearly, the instant invention can potentially help to accelerate the emergence of a vibrant EV industry.

Example 11

Preparation of Electrodes for Potassium Metal Cells Featuring a Quasi-Solid Electrolyte A sheet of potassium film was used as the anode active material while a layer of PVDF-bonded reduced graphene oxide (RGO) sheets, supplied from Angstron Materials, Inc. (Dayton, Ohio), was used as the cathode active material. The electrolyte used was 1 M (control) and 4.5 M of $KClO_4$ salt dissolved in a mixture of propylene carbonate and DOL (1/1 ratio). Charge-discharge curves were obtained at several current densities (from 50 mA/g to 50 A/g), corresponding to different C rates, with the resulting energy density and power density data measured and calculated.

Figure 13:
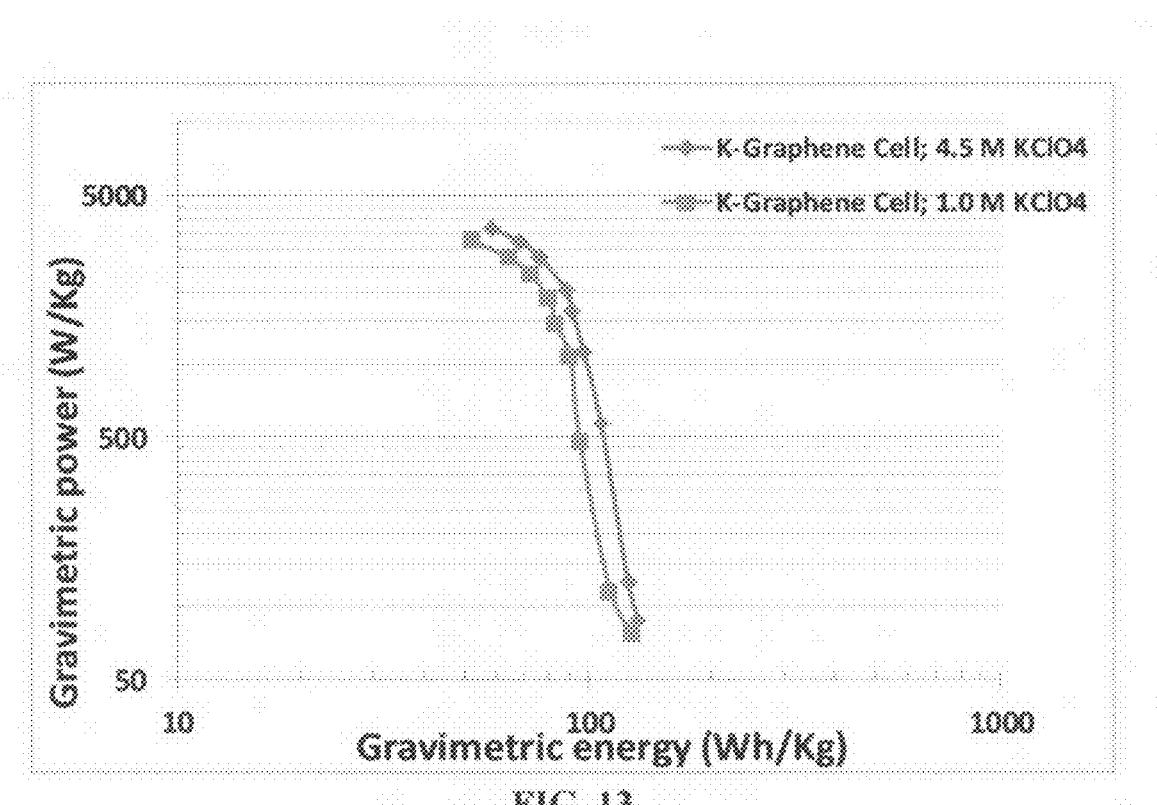
FIG. 13 Ragone plots (cell power density vs. cell energy density) of two K metal cells each having a graphene cathode with the potassium salt concentrations being x=0.06 and 0.37, respectively.

The energy density and power density data of these two cells are summarized in the Ragone plots of FIG. 13. Again, the cell containing a quasi-solid electrolyte exhibits consistently higher energy density and higher power density as compared with the corresponding cell having lower concentration electrolyte.

Example 12

Evaluation of Electrochemical Performance of Various Cells

In several examples, we proceeded to investigate how the alkali metal salt concentration in an organic solvent would affect the electrochemical behaviors of Na-ion or Na metal cells. We immediately encountered some major challenges. First, we did not have a wide range of alkali metal salt concentrations at our disposal. Most of the alkali metal salts could not be dissolved in those solvents commonly used in Na-ion and Li-ion cells for more than a molar ratio of 0.2-0.3. Second, we quickly came to realize that the viscosity of many organic liquid solvents was already high at room temperature and adding more than 0.2-0.3 molar ratio of an alkali metal salt in such a viscous solid made the resulting mixture look like and behave like a solid. It was next to impossible to use a stirrer to help disperse the solid alkali metal salt powder in the liquid solvent. Further, a higher solute concentration was generally believed to be undesirable since a higher concentration normally would result in lower ion conductivity in the electrolyte. This would not be conducive to achieving a higher power density, lower polarization, and higher energy density (at high charge/discharge rates). We almost gave up, but decided to move forward anyway. The research results have been most surprising.

Contrary to the expectations by electrochemists and battery designers that a significantly higher alkali metal salt concentration could not be produced, we found that a concentration as high as x=0.2-0.6, roughly corresponding to 3-11 M of an alkali metal salt in some organic liquid could be achieved, if a highly volatile solvent (such as AN or DOL) is added as a co-solvent first. Once a complete dissolution of an alkali metal salt in a mixture solvent is attained, we could choose to selectively remove the co-solvent. We were pleasantly surprised to observe that partial or complete removal of the more volatile co-solvent upon complete salt dissolution would not result in crystallization or precipitation of the salt from the organic liquid solvent even though the salt (a solute) was then in a highly supersaturated condition.

We have further defied the expectation of battery chemists and engineers that a higher electrolyte concentration would lead to a lower discharge capacity. Most surprisingly, the alkali metal cells containing a higher-concentration electrolyte system exhibit not only a generally higher energy density and higher power density but also a dramatically more stable cycling behavior and longer cycle life. The quasi-solid electrolytes are non-flammable and safe. Furthermore, they appear to be amenable to the prevention of alkali metal dendrite formation during repeated charges/discharges of the battery.

In summary, the present invention provides an innovative, versatile, and surprisingly effective platform materials technology that enables the design and manufacture of superior alkali metal and alkali metal-ion rechargeable batteries. The battery cell featuring a high-concentration electrolyte system exhibits a stable and safe anode (no dendrite-like feature), high alkali metal utilization rate, high cathode active material utilization rate, high specific capacity, high specific energy, high power density, and long cycle life.

The presently invented Na or K metal cells can provide a specific energy greater than 200 Wh/Kg (more typically greater than 300 Wh/Kg, often greater than 400 Wh/Kg, and even achieving an unprecedented 500 Wh/Kg in some cases) based on the total cell weight including anode, cathode, electrolyte, separator, and current collector weights combined. This has not been achieved by any prior art approaches for these types of cells.

The invention claimed is:

1. A non-flammable quasi-solid electrolyte for use in a rechargeable alkali metal cell, said electrolyte comprising an alkali metal salt dissolved in an organic liquid solvent with a concentration higher than 2.5 M or said alkali metal salt having a molecular ratio greater than 0.2, wherein said alkali metal is selected from sodium (Na), potassium (K), a combination of Na and K, or a combination of Na and/or K with lithium (Li) and said alkali metal does not include lithium alone.

2. The non-flammable quasi-solid electrolyte of claim 1, wherein said alkali metal salt concentration is sufficiently high so that said electrolyte exhibits a vapor pressure less than 0.01 kPa when measured at 20° C., a vapor pressure less than 60% of the vapor pressure of said first organic solvent when measured alone, a flash point at least 20 degrees Celsius higher than a flash point of said first organic liquid solvent when measured alone, a flash point higher than 150° C., or no detectable flash point.

3. The non-flammable quasi-solid electrolyte of claim 1, wherein said concentration of alkali metal salt is greater than 3 M or said alkali metal salt has a molecular ratio greater than 0.25.

4. The non-flammable quasi-solid electrolyte of claim 1, wherein said concentration of alkali metal salt is greater than 4 M or said alkali metal salt has a molecular ratio greater than 0.3.

5. The non-flammable quasi-solid electrolyte of claim 1, wherein said concentration of alkali metal salt is greater than 5 M or said alkali metal salt has a molecular ratio greater than 0.4.

6. The non-flammable quasi-solid electrolyte of claim 1, wherein said concentration of alkali metal salt is greater than 6 M or said alkali metal salt has a molecular ratio greater than 0.5.

7. The non-flammable quasi-solid electrolyte of claim 1, wherein said concentration of alkali metal salt is greater than 7 M or said alkali metal salt has a molecular ratio greater than 0.6.

8. The non-flammable quasi-solid electrolyte of claim 1, wherein said electrolyte has a sodium or potassium ion transference number greater than 0.3.

9. The non-flammable quasi-solid electrolyte of claim 1, wherein said electrolyte has a sodium or potassium ion transference number greater than 0.4.

10. The non-flammable quasi-solid electrolyte of claim 1, wherein said electrolyte has a sodium or potassium ion transference number greater than 0.5.

11. The non-flammable quasi-solid electrolyte of claim 1, wherein said electrolyte has a sodium or potassium ion transference number greater than 0.6.

12. The non-flammable quasi-solid electrolyte of claim 1, wherein said first organic liquid solvent is selected from the group consisting of 1,3-dioxolane (DOL), 1,2-dimethoxy-ethane (DME), tetraethylene glycol dimethylether (TEGDME), poly(ethylene glycol)dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-buty-rolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

13. The non-flammable quasi-solid electrolyte of claim 1, wherein said non-lithium alkali metal salt is selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

14. The non-flammable quasi-solid electrolyte of claim 13, wherein said electrolyte further contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

15. The non-flammable quasi-solid electrolyte of claim 1, wherein said electrolyte further contains an ionic liquid solvent and a first organic liquid solvent-to-ionic liquid solvent ratio is greater than 1/1.

16. The non-flammable quasi-solid electrolyte of claim 15, wherein said ionic liquid solvent is selected from a room temperature ionic liquid having a cation selected from tetra-alkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

17. The non-flammable quasi-solid electrolyte of claim 15, wherein said ionic liquid solvent is selected from a room temperature ionic liquid having an anion selected from $BF_4^-$; $B(CN)_4^-$, $CH_3BF_3^-$, $CH_2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

18. A rechargeable alkali metal cell wherein said alkali metal is selected from sodium (Na), potassium (K), a combination of Na and K, a combination of Na and/or K with lithium (Li); said cell comprising a cathode having a cathode active material, an anode having an anode active material, a porous separator electronically separating said anode and said cathode, a non-flammable quasi-solid electrolyte of claim 1 in contact with said cathode and said anode.

19. The rechargeable alkali metal cell of claim 18, wherein said cathode active material contains a sodium intercalation compound selected from $NaFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, NiHCF, $Na_xMnO_2$, $NaCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

20. The rechargeable alkali metal cell of claim 18, wherein said cathode active material is selected from a functional material or nano-structured material having an alkali metal ion-capturing functional group or alkali metal ion-storing surface in direct contact with said electrolyte.

21. The rechargeable alkali metal cell of claim 20, wherein said functional group reversibly reacts with an alkali metal ion, forms a redox pair with an alkali metal ion, or forms a chemical complex with an alkali metal ion.

22. The rechargeable alkali metal cell of claim 20, wherein said functional material or nano-structured material is selected from the group consisting of:
(a) A nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon;
(b) A nano graphene platelet selected from a single-layer graphene sheet or multi-layer graphene platelet;
(c) A carbon nanotube selected from a single-walled carbon nanotube or multi-walled carbon nanotube;
(d) A carbon nano-fiber, nano-wire, metal oxide nano-wire or fiber, conductive polymer nano-fiber, or a combination thereof;
(e) A carbonyl-containing organic or polymeric molecule;
(f) A functional material containing a carbonyl, carboxylic, or amine group; and Combinations thereof.

23. The rechargeable alkali metal cell of claim 20, wherein said functional material or nano-structured material is selected from the group consisting of Poly(2,5-dihydroxy-1,4-benzoquinone-3,6-methylene), $Na_xC_6O_6$ (x=1-3), $Na_2(C_6H_2O_4)$, $Na_2C_8H_4O_4$ (Na terephthalate), $Na_2C_6H_4O_4$(Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof.

24. The rechargeable alkali metal cell of claim 20, wherein said functional material or nano-structured material has a specific surface area of at least 500 $m^2/g$.

25. The rechargeable alkali metal cell of claim 20, wherein said functional material or nano-structured material has a specific surface area of at least 1,000 $m^2/g$.

26. The rechargeable alkali metal cell of claim 20, wherein said functional material or nano-structured has a functional group selected from —COOH, =O, —$NH_2$, —OR, or —COOR, where R is a hydrocarbon radical.

27. The rechargeable alkali metal cell of claim 18 wherein said anode contains an alkali ion source selected from an alkali metal, an alkali metal alloy, a mixture of alkali metal or alkali metal alloy with an alkali intercalation compound, an alkali element-containing compound, or a combination thereof.

28. The rechargeable alkali metal cell of claim 18 wherein said anode active material contains an alkali intercalation compound selected from petroleum coke, carbon black, amorphous carbon, hard carbon, templated carbon, hollow carbon nanowires, hollow carbon sphere, titanates, $NaTi_2(PO_4)_3$, $Na_2Ti_3O_7$, $Na_2C_8H_4O_4$, $Na_2TP$, $Na_xTiO_2$ (x=0.2 to 1.0), carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

29. The rechargeable alkali metal cell of claim 27, wherein the alkali intercalation compound or alkali-containing compound is selected from the following groups of materials:
(a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) Sodium- or potassium-containing alloys or intermetallic compounds of Si, Ge, Sn, Pb, Sb, Bi, Zn, Al, Ti, Co, Ni, Mn, Cd, and their mixtures;
(c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and
(d) Sodium or potassium salts.

\* \* \* \* \*